(12) United States Patent
Kadrnoska et al.

(10) Patent No.: US 7,514,628 B2
(45) Date of Patent: Apr. 7, 2009

(54) CABLE LAYING CONFIGURATION

(75) Inventors: Helmut Kadrnoska, Vienna (AT); Gerhard Reiss, Laxenburg (AT)

(73) Assignee: Wien Kanal-Abwassertechnologien GesmbH, Vienna (AT)

( * ) Notice: Subject to any disclaimer, the term of this patent is extended or adjusted under 35 U.S.C. 154(b) by 22 days.

(21) Appl. No.: 11/519,484

(22) Filed: Sep. 12, 2006

(65) Prior Publication Data

US 2007/0077125 A1 Apr. 5, 2007

Related U.S. Application Data

(63) Continuation of application No. PCT/AT2005/000079, filed on Mar. 8, 2005.

(30) Foreign Application Priority Data

| Mar. 12, 2004 | (AT) | ............................ A 446/2004 |
| Jun. 24, 2004 | (AT) | ........................... A 1081/2004 |
| Oct. 25, 2004 | (AT) | ........................... A 1801/2004 |

(51) Int. Cl.
*H01B 7/00* (2006.01)

(52) U.S. Cl. ...................... 174/24; 174/25 R

(58) Field of Classification Search .............. 174/36, 174/24, 25 R

See application file for complete search history.

(56) References Cited

U.S. PATENT DOCUMENTS

| 384,860 A * | 6/1888 | Meehan ................. 138/108 |
| 6,311,730 B2 * | 11/2001 | Penza ................... 138/98 |
| 6,463,960 B1 * | 10/2002 | Madhani et al. ........... 138/98 |
| 7,004,681 B2 * | 2/2006 | Penza ................. 405/183.5 |
| 2003/0034080 A1 * | 2/2003 | Second ................. 138/115 |
| 2004/0146362 A1 * | 7/2004 | Penza ................. 405/184.4 |

FOREIGN PATENT DOCUMENTS

| DE | 298 16 103 U1 | 1/1999 |
| EP | 1 394 589 A1 | 3/2004 |
| WO | WO 03/038330 A1 | 5/2003 |

* cited by examiner

*Primary Examiner*—William H Mayo, III
(74) *Attorney, Agent, or Firm*—Laurence A. Greenberg; Werner H. Stemer; Ralph E. Locher

(57) ABSTRACT

A laid cable configuration contains cables, preferably electric cables, data and information transport cables and/or control cables, in particular fiber optic cables, and fluid transport tubes and is to be disposed in galleries, tunnels, shafts, pipes, channels or the like, in particular water and/or waste-water guiding systems. The configuration contains at least one cable which is to be laid, which can be unwound from a drum from the region of an opening providing access to an installation shaft or access shaft toward the respective pipe or channel, or drawn or fixed in a stationary manner in the pipe, channel or the like. The configuration includes a flexible and/or articulated carrier band having lateral edges that are laid against an inner wall surface of the pipe or the channel. A weighting body is suspended from the carrier band.

64 Claims, 18 Drawing Sheets

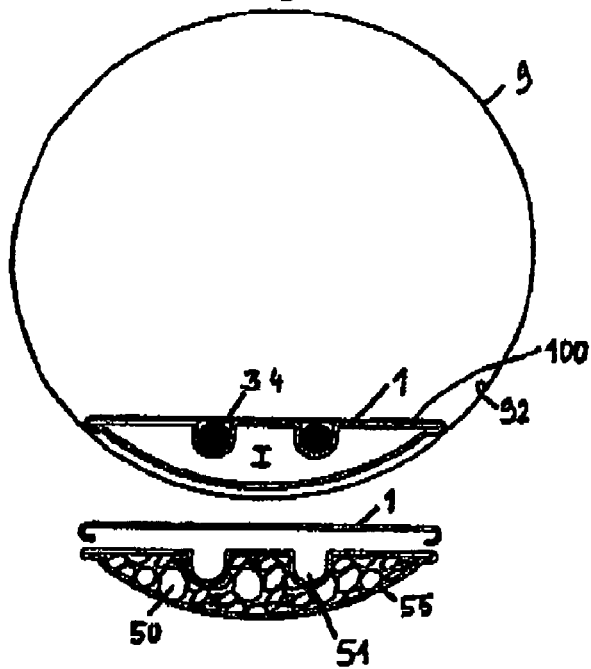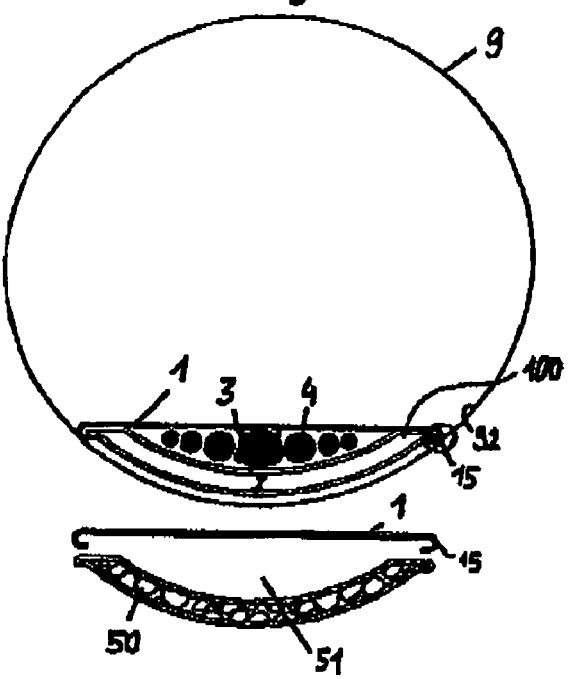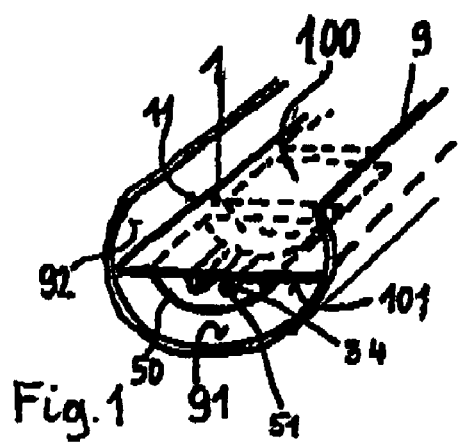

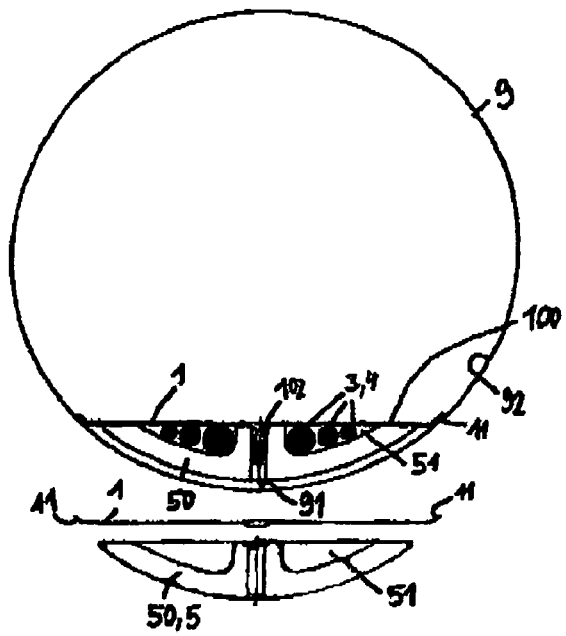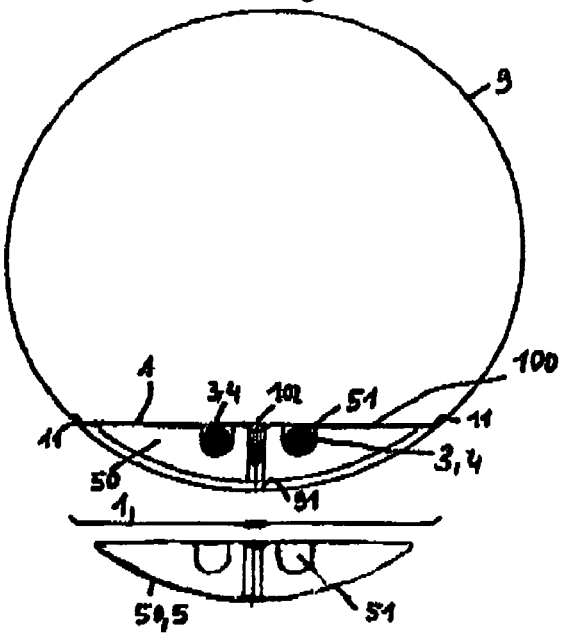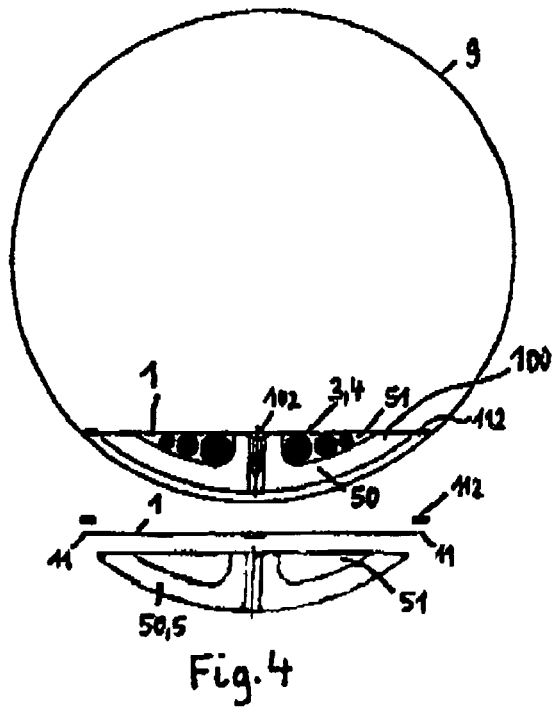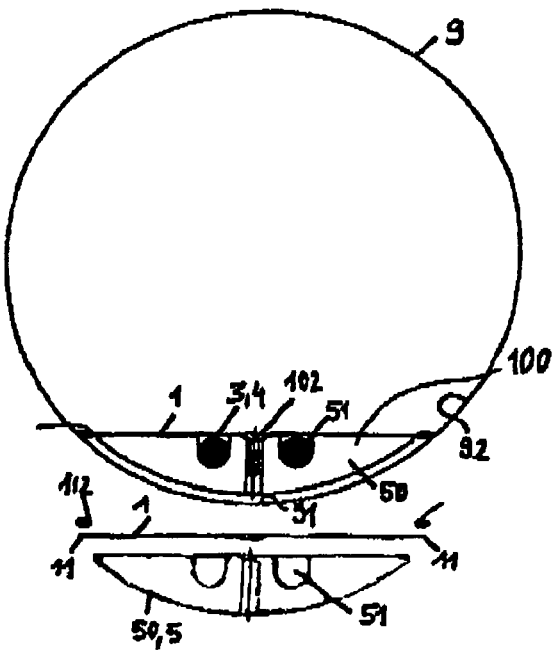

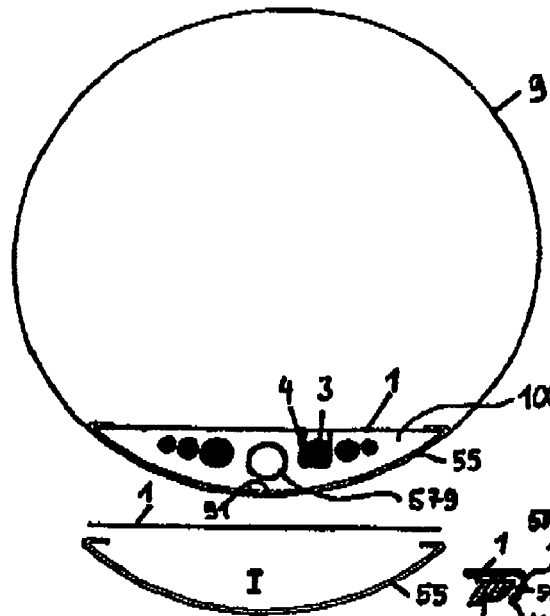
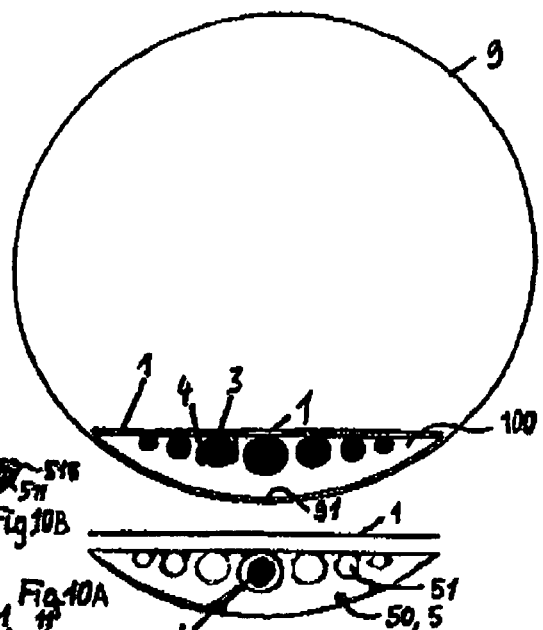
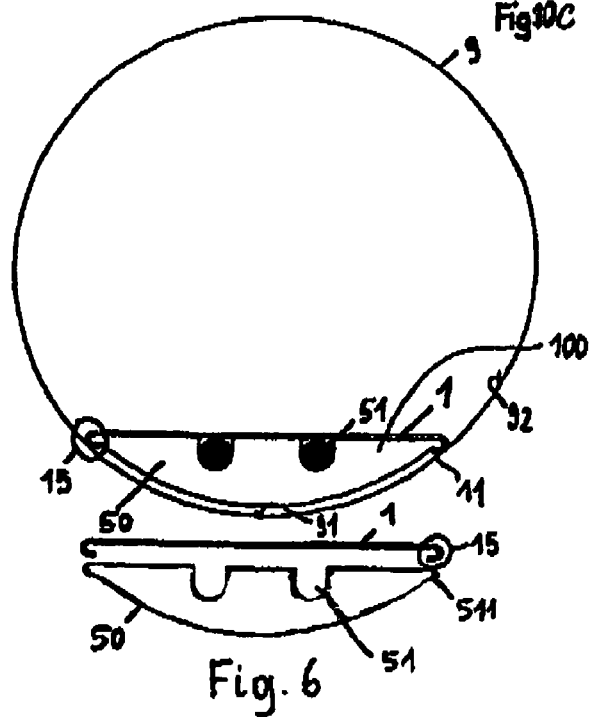
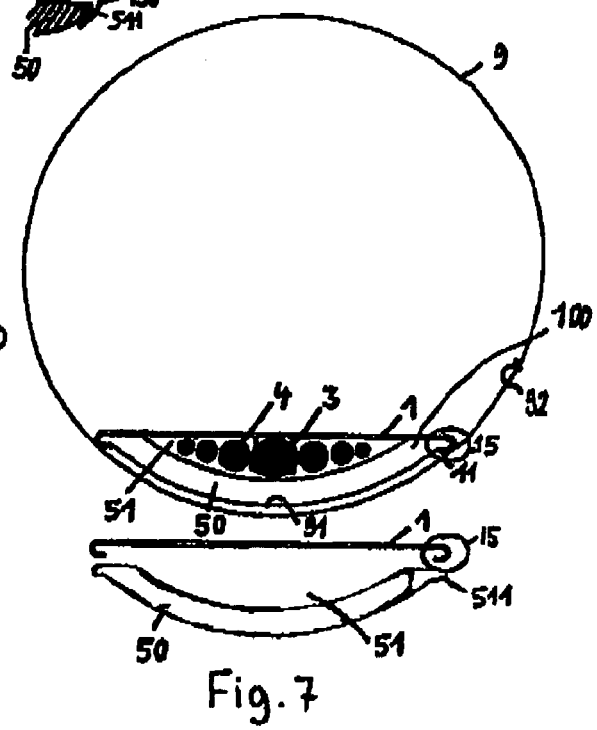

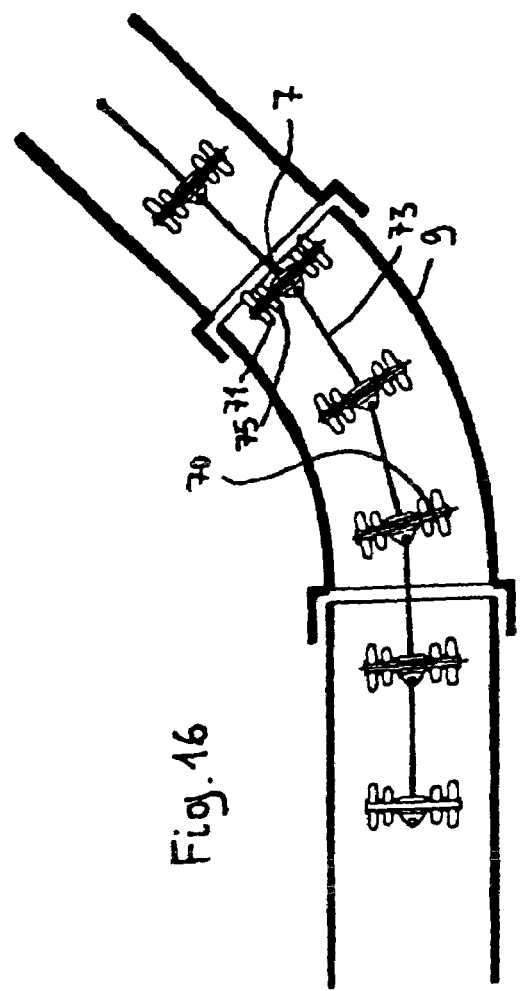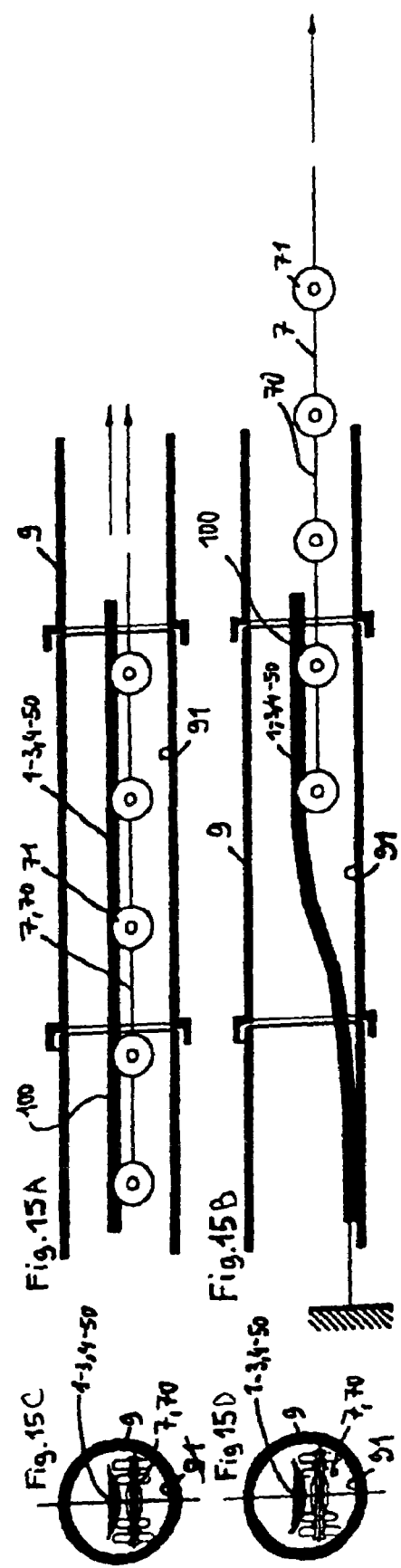

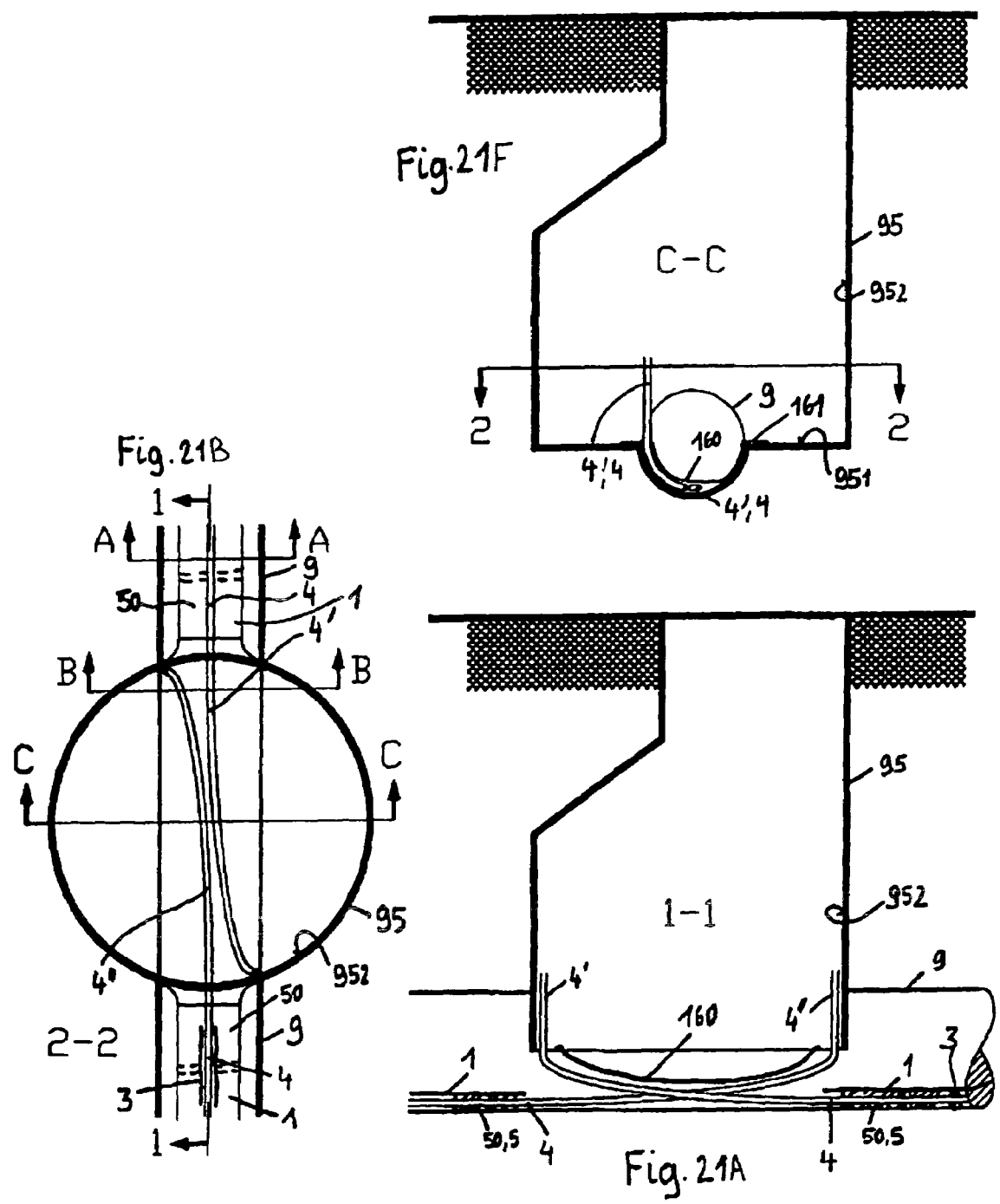

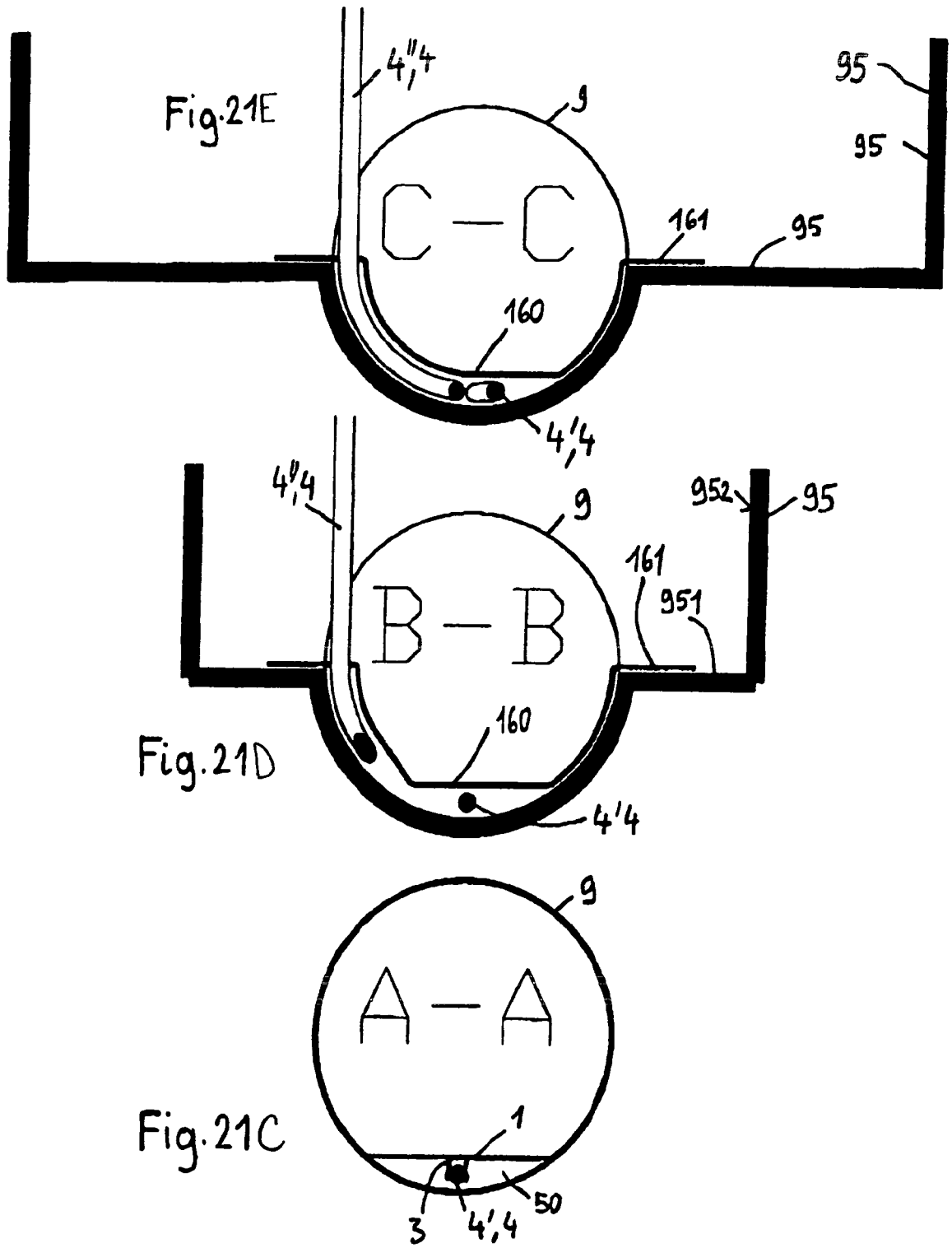

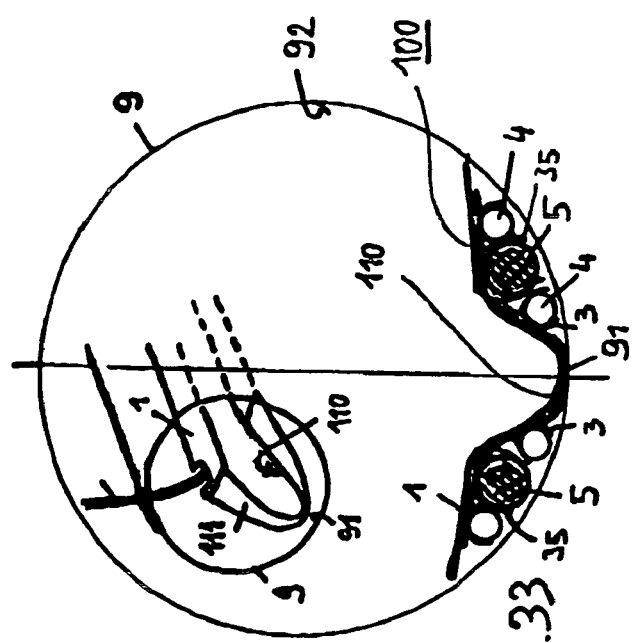
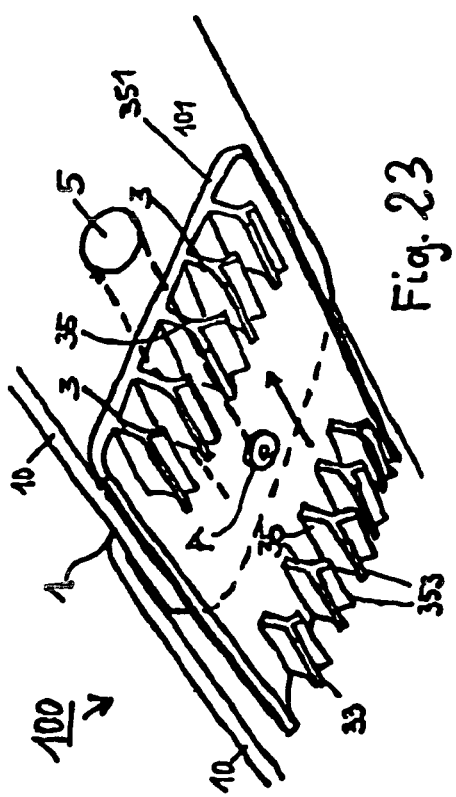
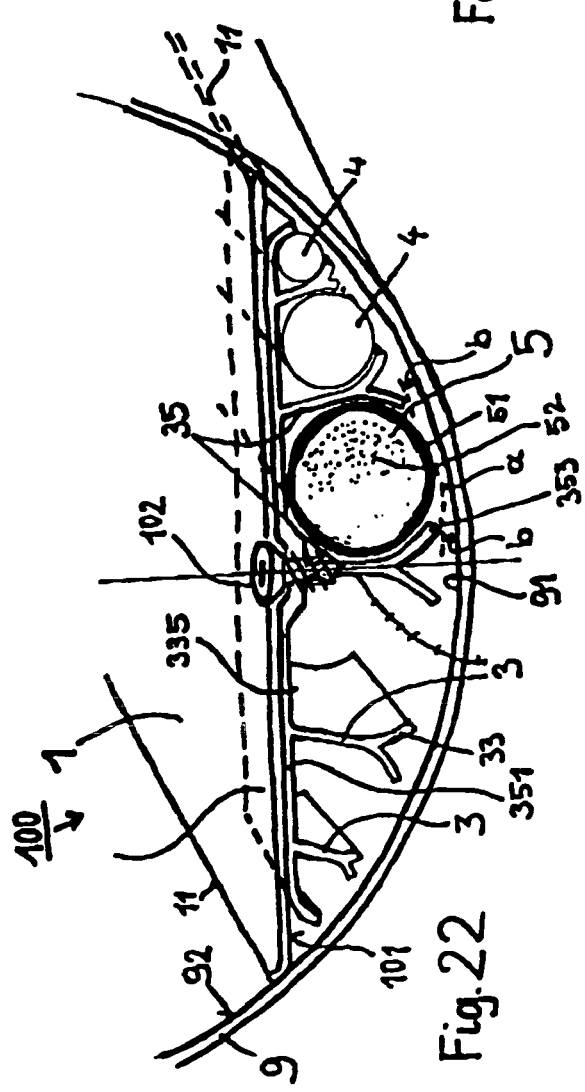
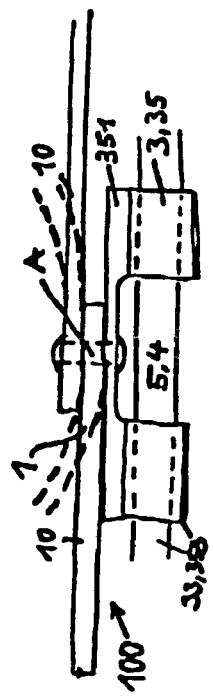

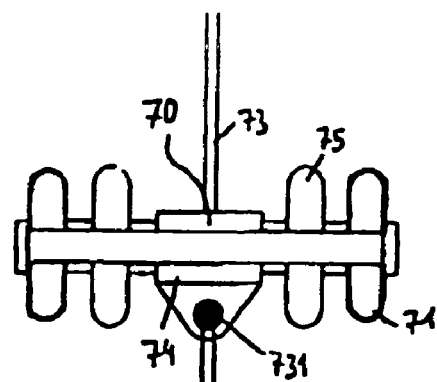
Fig. 28
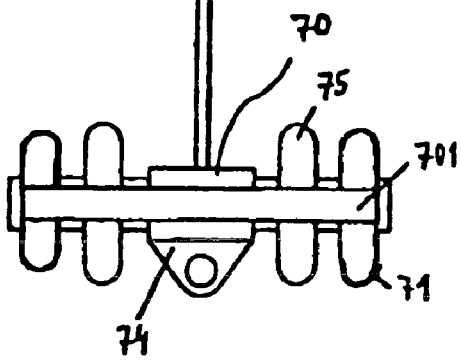
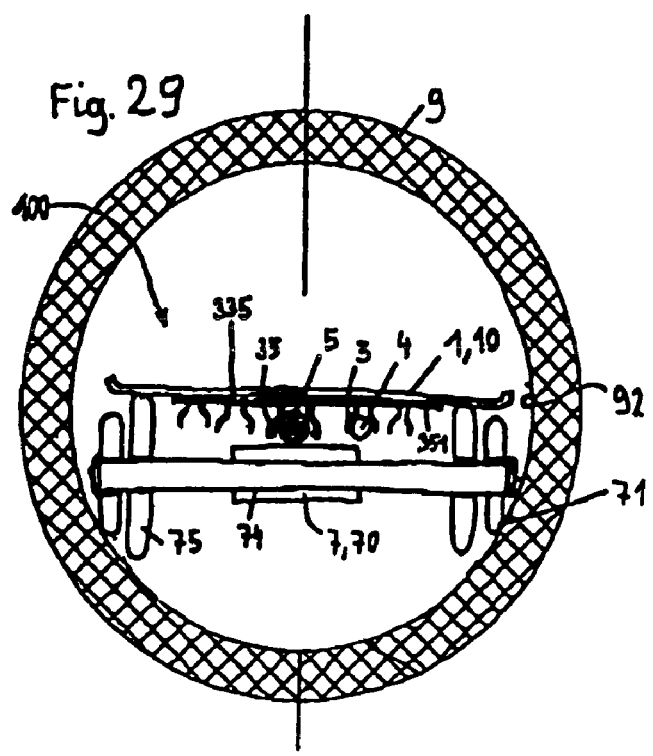
Fig. 29

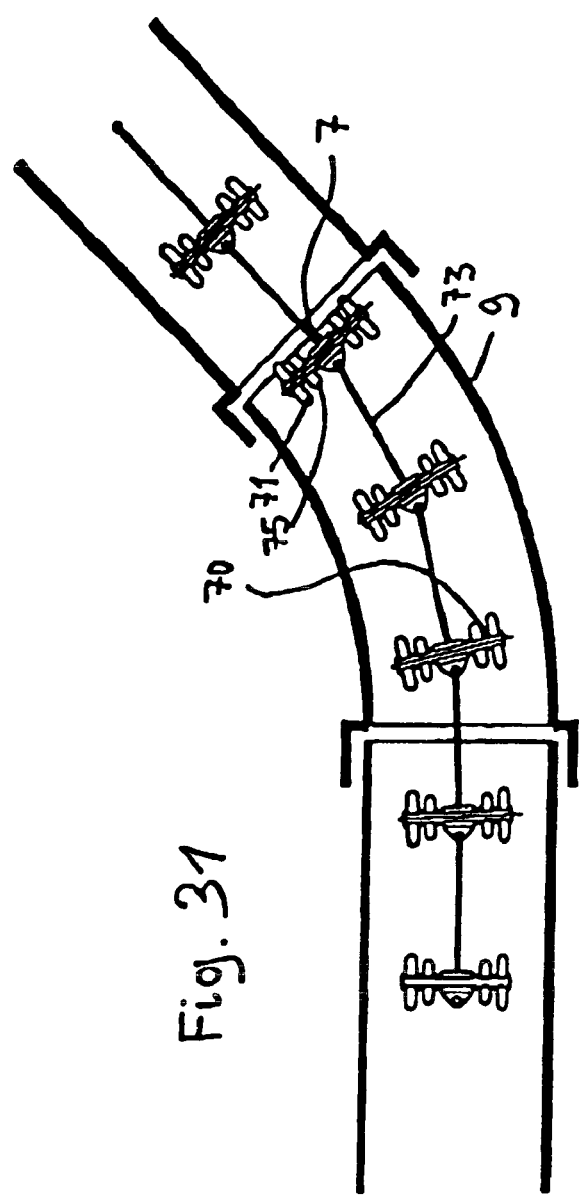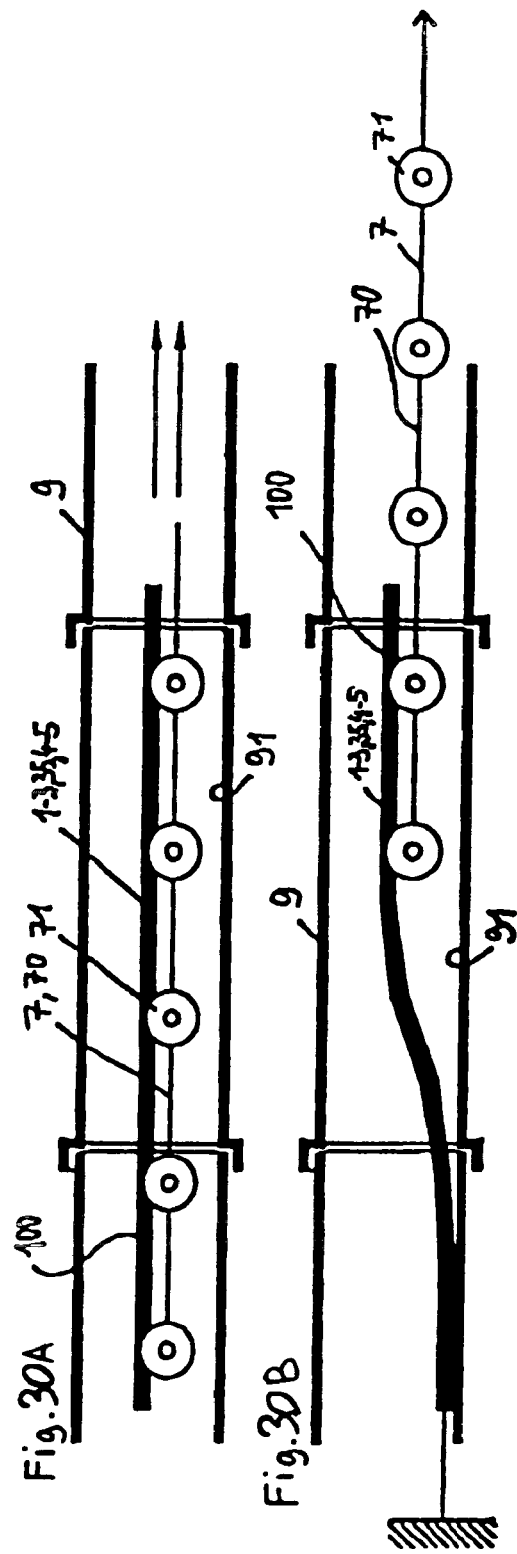

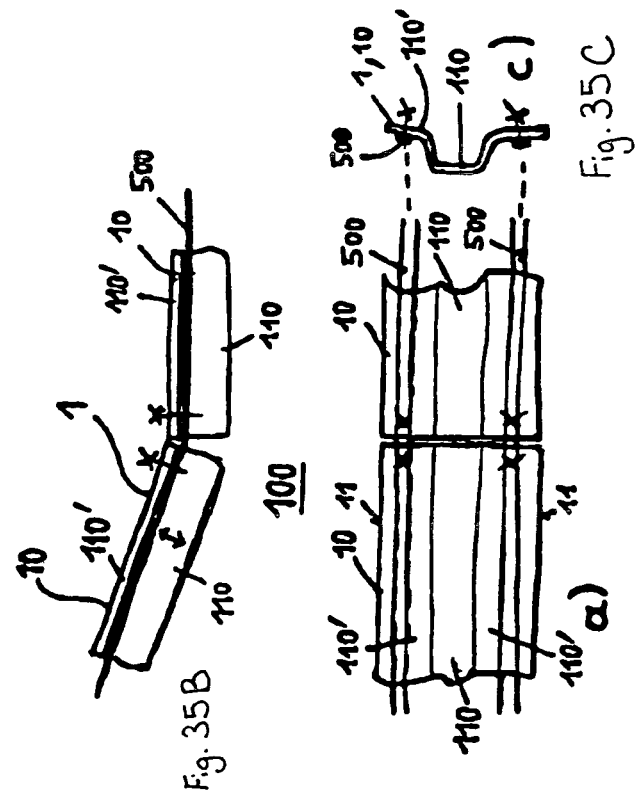
Fig. 35A
Fig. 35B
Fig. 35C
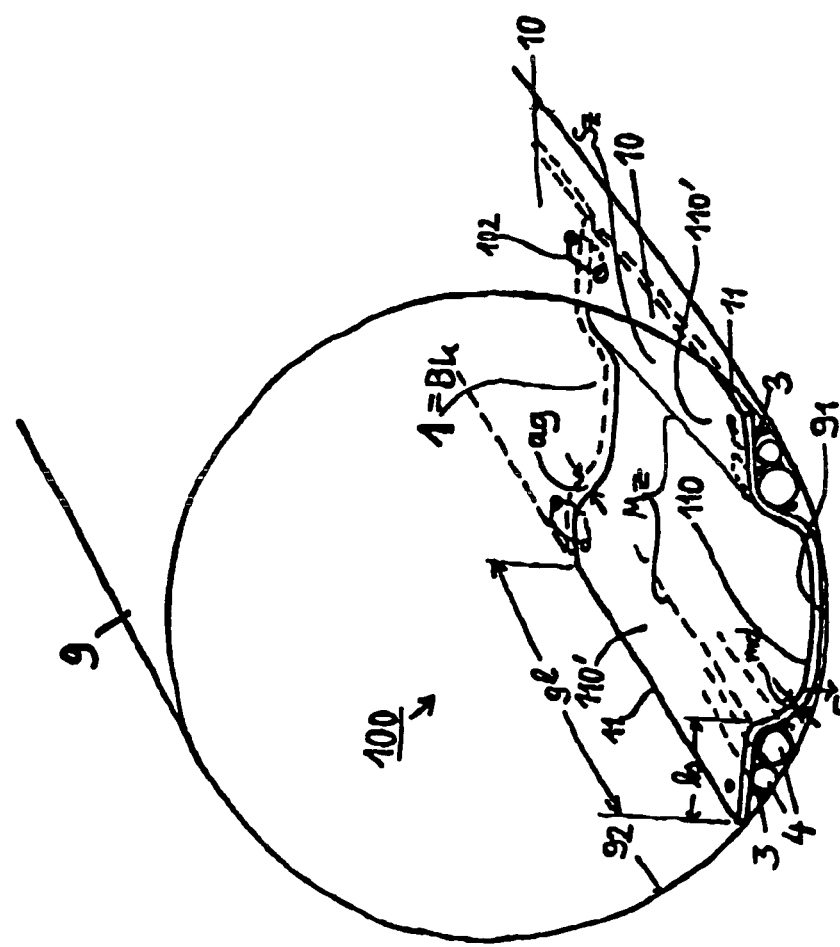
Fig. 34

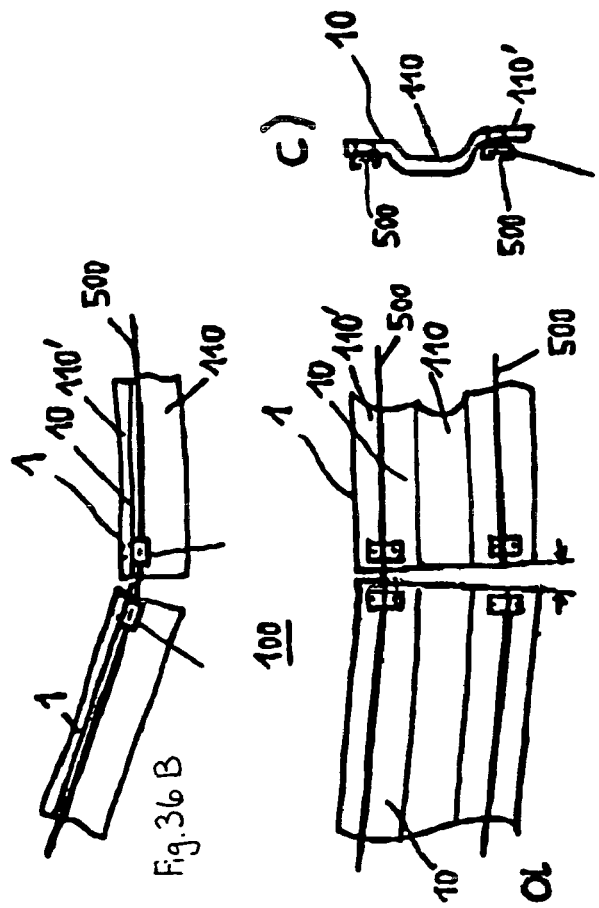
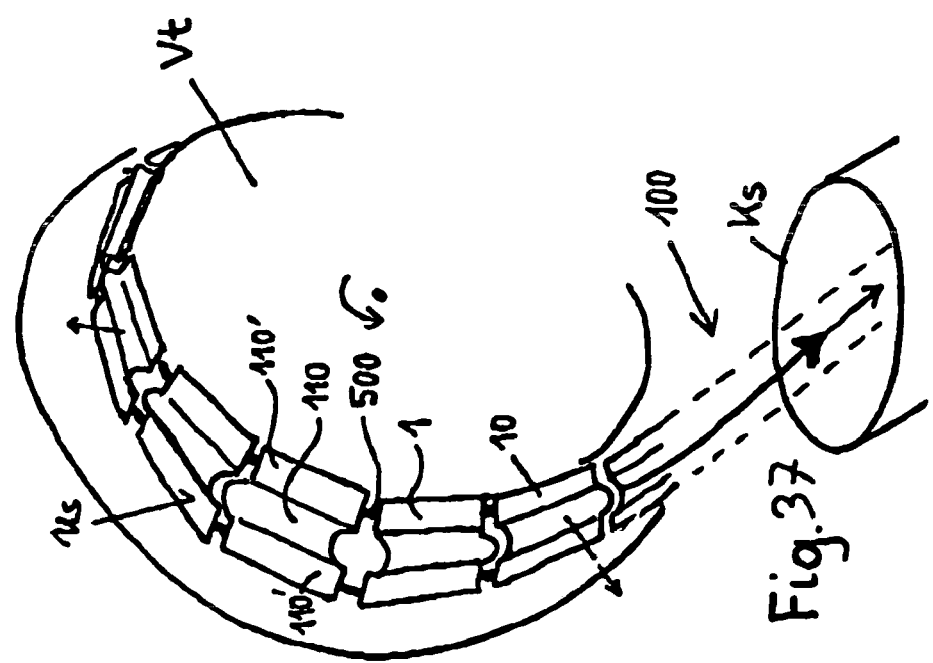

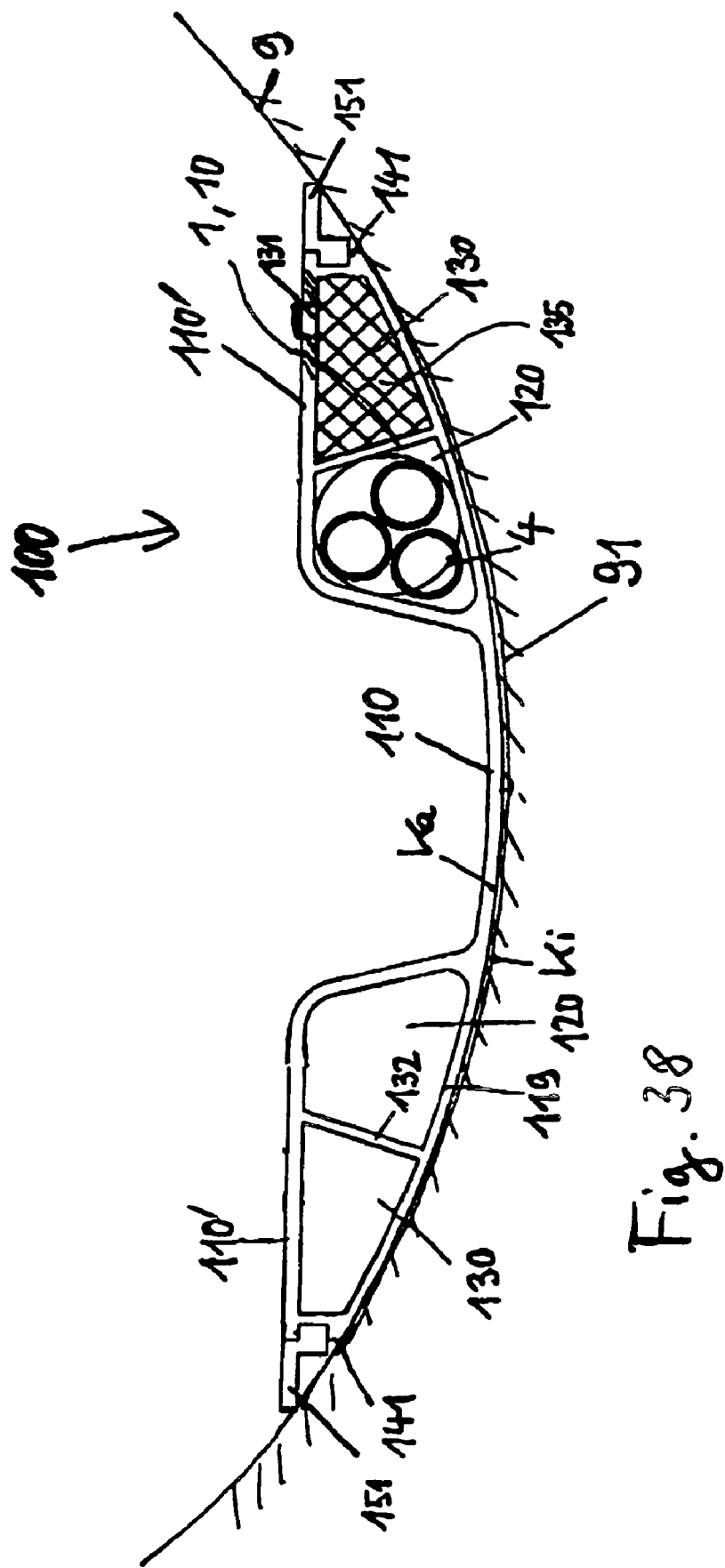

CABLE LAYING CONFIGURATION

CROSS-REFERENCE TO RELATED APPLICATIONS

This is a continuing application, under 35 U.S.C. §120, of copending international application No. PCT/AT2005/000079, filed Mar. 8, 2005, which designated the United States; this application also claims the priority, under 35 U.S.C. §119, of Austrian patent application Nos. A 446/2004, A 1081/2004, and A 1801/2004, respectively filed Mar. 12, 2004, Jun. 24, 2004, and Oct. 25, 2004; the prior applications are herewith incorporated by reference in their entirety.

BACKGROUND OF THE INVENTION

The present invention relates to a new cable laying configuration, preferably electric cables, data and information transport cables and/or control cables, in particular fiber optic cables, fluid transport tubes or the like in galleries, tunnels, shafts, pipes, channels or the like, in particular water and/or waste-water guiding systems. The configuration contains at least one cable which is to be laid, which can be unwound from a drum from the region of an opening providing access to an installation shaft or access shaft or the like toward the respective pipe, channel or the like, or drawn or fixed in a stationary manner in the pipe, channel or the like.

Furthermore, it relates to a method for laying cables in pipes, channels or the like using the aforementioned configuration and auxiliary devices to support the new cable laying system.

The high growth rate in the field of information technology and telecommunications, but also the ever increasing power demand has made a large-scale construction of the transmission lines and cables of the most varied types and their interconnection required in the last few years.

Even in those fields with few obstacles, the lines or cables provided for the noted purposes are no longer laid to a large extent over trouble-prone overhead lines in the country, but, if possible, underground whereby, although the excavation and laying work required for this is relatively expensive, it is hampered relatively little by other underground installations.

Laying cables and lines of this type under the surface in congested city areas is much more difficult, whereby the aspect of traffic obstructions due to excavation work should be noted here as a substantial disadvantage, in addition to the abundance of existing underground installations. In the course of constructing line systems and data networks with high transmission densities and rates, fiber optic or glass fiber cables represent a substantial improvement and it has already been common for some time to avoid the excavation and construction work required for laying them and to use the existing underground infrastructure of the supply and disposal networks, in particular for water and waste water pipes or sewage systems, for laying cables of this type. It has become routine in many large cities to not only lay data transmission, control and information carrier cables in underground conduit systems but also e.g. power cables.

The great advantage of this type of cable laying is that it is no longer necessary to open the ground, associated with a destruction of traffic areas, pavements and significant traffic interference with all the unpleasant requirements and consequences, such as e.g. involvement of several authorities, restoration work and the like, as a result of which considerable time, work and cost savings are obtained and, at the same time, relatively high flexibility with respect to the laying section.

Of course, a substantial requirement continues to exist, namely that the laying technology in underground supply and disposal systems can take place with as low an expenditure as possible and that a quick laying is made possible in a short time under the inherently more difficult conditions existing in conduit systems without considerable problems.

A technology often used in the past for laying cables and cable lines existed essentially in that cable supports with fixtures for holding or clamping the cable are installed in each case on the walls or on the cover of a tunnel, a channel or the like at distances of about one to two meters and that they are provided with cover plates, hoods or the like.

Furthermore, since that time, a large number of proposals have become known for cable-support pipes or profiles having endless gutter or hollow profiles that can be unwound from winding drums at an installation site.

SUMMARY OF THE INVENTION

It is accordingly an object of the invention to provide a cable laying configuration which overcome the above-mentioned disadvantages of the prior art devices and methods of this general type, which requires a relatively low material and manipulation expenditure when positioning stationary cables (substantially equivalent to fastening the cables) in pipes, channels and the like.

Therefore, the object of the present invention is a novel cable laying configuration of laying cables in pipes, channels or the like of the aforementioned type which is characterized in that a stationary positioning of the cables and/or the laying configuration which is optionally maintained by a cable support, is obtained and ensured by the force of gravity and the frictional fit thus arising. It is especially advantageous if the configuration contains a flexible and/or articulated carrier band which can be pulled into the pipe or into the channel, disposed at a distance from the bottom of the pipe, the channel sole or the like and which can preferably be placed against the inner wall surface of the pipe or channel, adjoining both sides with its lateral edges, optionally forming a substantially flat second sole in the pipe or channel disposed above the pipe base and/or channel sole. On an underside pointing to the pipe base and/or channel sole, cable supports are provided for mounting the cable. At least one continuous weighting body is provided on the pipe base and/or channel sole and prevent the cable from rising in the water, waste water or the like in the pipe and/or channel or flowing through them, or a multitude or plurality of weighting elements spaced from one another. Within the scope of the present invention, an especially stable cable laid configuration is provided if the weighting body or the weighting elements lies/lie on the channel sole in which it is provided that the weighting body or the weighting elements is/are suspended on the carrier band supported on both sides on the pipe wall, attached to the underside thereof, and the carrier band(s) is/are disposed pressed against the inner wall surfaces of the pipe and/or channel with its lateral edges.

In each case, the weight of the weighting body or elements, i.e. the effect of the force of gravity and the frictional fit released or effected therewith between the underside and the pipe base or channel sole and/or between the lateral edges of the carrier band and the inner surface of the pipe or channel wall is fully sufficient for a stationary stabilization of the configuration without any further auxiliary devices for fastening and, as was found, also in channels or channel sections having a large incline and high flow rate of the water, waste water or the like.

Advantageously, the weighting body or elements is/are configured with gutter-like recesses or the like having cross sections corresponding to the slope and the cross-sectional shape of the cables.

Hardened inorganic binding substances, such as concrete or mortar material, are suitable as material for the weighting body or elements, whereby it is preferable to use as additives, instead of conventional crushed rock or sands or together with them, minerals having a higher density than quartz, i.e. in particular based on barium oxide, ferric oxides, e.g. hematite, iron slag or the like.

However, hardening binding substances based on synthetic resins can also be used, such as e.g. polyesters, with heavy fillers, such as in particular barium oxide, ferric oxides, slags, optionally mixed with conventional sands for producing weighting bodies or elements.

An important further advantage of the cable laying configuration lies in that the carrier band which adjoins the inner wall of the channel or pipe with its two lateral edges, assumes, in addition to the local stabilization of the cables by the underside weighting elements, the function of a channel sole on the upper side. This "second sole" has the advantage that it is flat and comparatively "smooth" which reduces the friction of water or waste water when flowing through, as a result of which the flow rate is increased so that the flow cross section reduced by the new cable-retaining configuration deposited on the bottom of the pipe or channel floor is compensated. Furthermore, due to the flattening obtained with the "second sole", the clearing operations are facilitated which admittedly must also be carried out substantially less frequently since the tendency to deposit and precipitate thick and solid materials is substantially reduced due to the "smooth" surface of the carrier band. On the other hand, there is the further advantage that fine (sludge) particles contained in the waste water reach below the carrier band and clog all cavities located there between the underside of the carrier band and the bottom of the pipe and ultimately form a compact filling which further increases the frictional fit, substantially contributing to the local stabilization that has already been discussed above.

According to an embodiment of the invention, the connection of the carrier band and the weighting body or weighting elements can be formed by simple screws or by adhesion or also by mutual clamping or gripping zones or profiles on the lateral edges disposed on the carrier band and on the weighting element or on a casing for same.

In a further embodiment of the invention, the weighting body or the weighting elements is formed with a hardened binding agent preferably being concrete or mortar mass, and fastened to the carrier band by fastening elements.

In a further special embodiment of the new cable-laying configuration, the weighting elements can be formed in situ, i.e. just prior to pulling the carrier band into the pipe or into the channel by saturating corresponding, not loaded at first, open-pore sponge-like or foam-like bases with a flowable binding mass and subsequent hardening.

In an advantageous variation of an embodiment of the invention, the weighting body or the weighting elements are formed as a hollow body that can be filled with a weighting material of a specific minimum density. The same materials as already noted above as additives and binding agents of the weighting bodies or elements are suitable as fillers in this case.

In accordance with a further type of the cable-laying configuration according to the invention, an in-situ filling of the interior space formed between carrier band and outer casings of the weighting element with an at first flowable and then binding and hardening binding mass inside the cavities is provided.

A variation of an embodiment of the invention, is preferred in the case in which the outer casing or shell is formed of a material that is permeable for flowable substances for the weighting body or for the weighting elements, as a result of which a binding of the weighting elements to the pipe base or the channel sole is obtained in addition to the weighting or the effect of gravity, which further increases the local stabilization of the configuration in the pipe or channel.

In accordance with a further feature of the invention, the carrier band is formed from a material that can be bent diagonally to its longitudinal extension, is elastic and can be bent up or down. The material is preferably plastic, polyester, epoxy resin, steel, steel plate or a plastic/steel composite material.

It is especially advantageous if, the carrier band is formed with articulated band links, as a result of which every curved longitudinal slope of a pipe or channel can also be accomplished out when pulling the carrier band in with the cables and the weighting elements.

Furthermore, it can be advantageous if a full, flat fit thereof with the lateral edge zones to the inner wall surface of the pipe can be obtained by flanging the lateral edges of the carrier band.

In a preferred embodiment, the a carrier band has side edges surrounded by an edge-embracing profile band, e.g. of plastic, which assist pulling the carrier band with the weighting bodies and cables into the pipe or into the channel which substantially facilitates by reducing the frictional resistance of the carrier band lateral edges on the inner wall surface of the pipe or channel.

The use of the new laid cable configuration within the scope of several embodiments of the carrier band retracting process forms a series of further closely related objects of the present applicant. Thus, it is provided that each finished weighting element be attached to the carrier band on the underside prior to being drawn into the pipe or channel.

On-site formation of the weighting elements is performed by filling the outer casings or shells provided therefor with bulk goods of sufficiently high density, e.g. crushed stones or sand and, in particular, with bulk goods having a density that is higher than quartz, e.g. barium oxide, ferric oxide, hematite or the like, or with a flow binder with heavy minerals as admixture that hardens later.

In the in situ process, a binding substance that is flowable at first and then sets and hardens is pumped or pressed into the cavity between carrier band and outer casing or shell of the weighting body through a tube or the like that is pulled into the channel with the carrier band.

In a further variation of the process, the in situ formation of the weighting body or weighting elements is performed by saturating fundamental substances of a corresponding form each containing a porous, absorbent or foam-like material with a flow binding substance.

To facilitate and increase the effectiveness of the draw-in process, an additional embodiment of the method is especially advantageous by using a carrier band draw-in auxiliary train. This additional device can be used to lay all cables and cable supports described in the present application or designed according to the invention.

The train is formed of individual link wagons carrying the carrier band for draw-in auxiliary train just mentioned.

A further additional and auxiliary device for all cable supports and cables according to the invention is provided to facilitate the laying of the carrier band with the weighting elements and their positioning on the pipe base or on the channel sole.

Other features which are considered as characteristic for the invention are set forth in the appended claims.

Although the invention is illustrated and described herein as embodied in a cable laying configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, perspective view of a cable laying configuration according to the invention;

FIGS. 2 to 7 are diagrammatic, sectional views of the configuration with "finished" weighting elements or bodies of a hardened binding agent, in particular concrete;

FIGS. 8 and 9 are diagrammatic, sectional views of the configuration with the elements having an outer casing and whose interior space is filled with bulk goods having an appropriate density or with an at first flowable and then hardening binding substance or which can be filled in situ;

FIGS. 10A, 10B and 10C are diagrammatic, sectional views of details of a clamp connection of a carrier band with the weighting element or body;

FIGS. 11 and 12 are diagrammatic, sectional views each showing configurations with continuous weighting bodies which can be filled in situ with a flowable weighting agent when pulled into the channel or immediately thereafter;

FIGS. 15A and 15B are diagrammatic, side views of two stages of a preferred embodiment of a laying process with the aid of an auxiliary train of this type;

FIGS. 15C and 15D are diagrammatic, front views of the two stages of the preferred embodiment of the laying process with the aid of tue auxiliary train of this type corresponding to FIGS. 15A and 15B, respectively;

FIG. 16 is a diagrammatic, top plan view of the auxiliary train in a curvature of a sewer pipe;

FIGS. 21A to 21F are diagrammatic, sectional views of a preferred embodiment of an armature drawn through a vertical shaft of a sewer pipe when used in the cable-laying configuration according to the invention;

FIG. 22 is a diagrammatic, perspective view of a configuration according to the invention for laying cables in pipes or channels;

FIG. 23 is diagrammatic, perspective view of the configuration of the weighting element retaining elements on the underside of the carrier band;

FIG. 24 is a detail drawing of the weighting body retaining element at the articulated connection of two band links of a carrier band;

FIG. 28 is a diagrammatic, top view of the link wagon of the carrier band draw-in auxiliary train;

FIG. 29 is a diagrammatic, side view of the link wagon of the carrier band draw-in auxiliary train;

FIGS. 30A and 30B are diagrammatic, side views of two stages of a preferred variant of the laying method with the aid of the auxiliary train shown in FIGS. 28 and 29;

FIG. 31 is a diagrammatic, top plan view onto the aforementioned auxiliary train in the curvature of a sewer pipe;

FIG. 33 is an illustration of an embodiment of the new configuration with an advantageously configured carrier band;

FIG. 34 is a diagrammatic, perspective view of the new cable-laying configuration;

FIG. 35A is a diagrammatic, bottom plan view of the carrier band;

FIG. 35B is a diagrammatic, side view of the carrier band shown in FIG. 35A;

FIG. 35C is a diagrammatic, sectional view of the carrier band shown in FIG. 35A;

FIG. 36A is a diagrammatic, bottom plan view of the carrier band;

FIG. 36B is a diagrammatic, side view of the carrier band shown in FIG. 36A;

FIG. 36C is a diagrammatic, sectional view of the carrier band shown in FIG. 36A;

FIG. 37 is a schematic illustration of an advantageous configuration of the carrier band on a carrier band drum and pulling the carrier band off from the drum;

FIG. 38 is a diagrammatic, sectional view of the carrier band with the weighting body.

DESCRIPTION OF THE PREFERRED EMBODIMENTS

Figure 13:
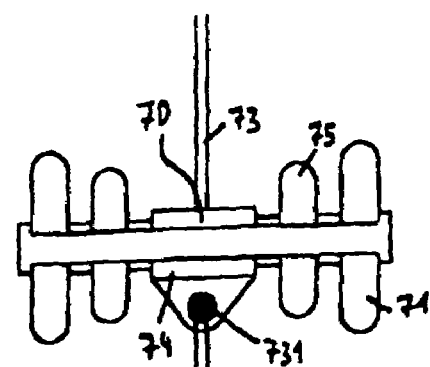
FIG. 13 is a diagrammatic, top plan view of a link wagon of a carrier band draw-in auxiliary train.

Referring now to the figures of the drawing in detail and first, particularly, to FIG. 1 thereof, there is shown how a carrier plate 1, e.g. of high-grade steel, is drawn into a sewer pipe 9 in a cable-laying configuration 100 according to the invention in such a way that it braces itself with its lateral edges 11 on a concave inner wall surface 92 of a pipe channel on both sides. A cable 4, which is optionally held or guided in a cable support profile 3, is disposed on an underside 101 of the carrier band 1 running along it, and, furthermore, a series of weighting elements 50, e.g. made of heavy concrete, which are spaced from one another and in a cylinder-segment like form, are attached to the underside 101, e.g. by screws 102 which on the whole form a "discontinuous" weighting body 5.

The weighting elements 50 have a correspondingly shaped groove-like recess 51 where the cable 4 runs. The weighting elements 50 are substantially formed analogously to a channel base 91 being a base of the sewer pipe 91, however, they are disposed continuously at a distance thereto. In this way, the weighting elements 50 "are suspended" so to say on the carrier band 1 and in this way the latter fully abuts and is pressed (supporting itself there) against the inner wall surface 92 of the sewer pipe 9 with its lateral edges 11.

With the reference numbers remaining the same, FIGS. 2 to 7 each show as an "ensemble" in the pipe and as individual components weighting elements 50 with recesses 51 having a contour adapted to the cable 4 or its contour. Furthermore, the carrier plate 1 with its lateral edges 11 adjoining or pressed against the inner surface 92 of the pipe wall which, as the details in FIGS. 2 and 3 clearly show, are flanged or in which, as can be seen in FIGS. 4 and 5, the side walls 11 are furnished with plastic slide profiles 112 that envelop them and facilitate the drawing into the pipe 9 by reducing the friction.

The screw connection 102 between the carrier plate or band 1 and the weighting element 50, fastened and adjoining its underside 101, can be clearly seen in each of FIGS. 2 to 4.

Furthermore, it can be clearly seen in these figures that the side of the weighting elements 50 facing the pipe base 91 is curved in a similar manner as the pipe base 91 or the inner surface of the pipe wall 92, however, that there is a distance everywhere between the pipe base 91 and the underside of the weighting element 50. In this way, the weighting element 50 does not come in contact with any point of the inner wall surface 92 of the pipe or with the pipe base 91 and does not lie on it. Therefore, in this case also, the carrier plate 1 "is suspended" and the same disposed in this way so as to be weighted.

In the embodiments of the configuration according to the invention shown in FIGS. 6 and 7 (with otherwise the same reference numbers), similar weighting elements 50 are provided which have extensions rounded on their lateral edges 511 and connected with the carrier band 1 and held in position by gripping zones 15 surrounding these extensions and found on the lateral edges 11 of the carrier band 1.

FIGS. 8 and 9 show (with otherwise the same reference numbers) two further cable-laying configurations 100 with elements that are similar in principle to the previously described weighting elements, whereby they are made with an outer casing or shell 55, e.g. of plastic, and whereby their interior space I between the shell 55 and the carrier band 1 is filled in each case with a bulk material 57 of sufficient density, e.g. gravel, crushed stones, sand or the like. In this case also, the carrier band 1 overlaps the lateral edges 511 of the weighting bodies 50 with its lateral edges 11 and in this case also, a "suspended" configuration of the weighting elements 50 is provided attached to the underside 101 of the carrier band 1.

FIGS. 10A, 10B, 10C show (with otherwise the same reference numbers) three possibilities for a clasping connection of the carrier band 1 and the weighting element 50 by appropriately configured gripping zones 15, 515 on the lateral edges 11 of the carrier band or on the lateral edges 511 of the weighting body 50 or a weighting body shell 55 encasing the same or else by a simple clamp profile 150 gripping the side edges 11, 511.

FIG. 11 shows (with otherwise the same reference numbers) an embodiment of the cable-laying configuration 1 according to the invention in which an on-site or in situ weighting takes place during or immediately after the carrier band 1 is drawn into the pipe 9 with the cables 4, and optionally cable supports 3, in that, in addition to the just mentioned cables 4, a conveyor tube 579 in the hollow interior space I of the outer casing 55 of the weighting body is also drawn into the pipe 9 for bringing or pressing a binding substance 57, which serves as a weighting agent that is flowable at first and then hardens, with the carrier band 1. It can be advantageous if the conveyor tube 579 has permeable openings in its wall for the flow binding substance 57, as a result of which flow binding substance 57 can exit and in this way more quickly fill the interior space I not only at the open end thereof but also laterally out of it.

A weighting aimed for within the scope of the configuration 100 follows another principle as an important aspect, which FIG. 12 shows a configuration (with otherwise the same reference numbers). A fundamental substance having an open-porous foam or sponge structure is there attached to the carrier band 1 on the underside, the fundamental substance being saturated with a flowable binding mass 57 each time before the carrier band 1 is drawn in with the cables 4, the binding substance setting so quickly already prior to the final deposit of the carrier band weighting body ensemble on the base of the sewer pipe 91 so that a first stability is obtained. Ultimately, a foam binder composite weighting body 5 is formed due to the hardening of the binding substance 57.

In the embodiment of the configuration 100 according to the invention shown in FIG. 11, a continuous weighting body 5 is formed. The weighting body 5 according to FIG. 12 can be configured continuously or in the form of weighting elements 50 that are spaced from one another.

Figure 14:
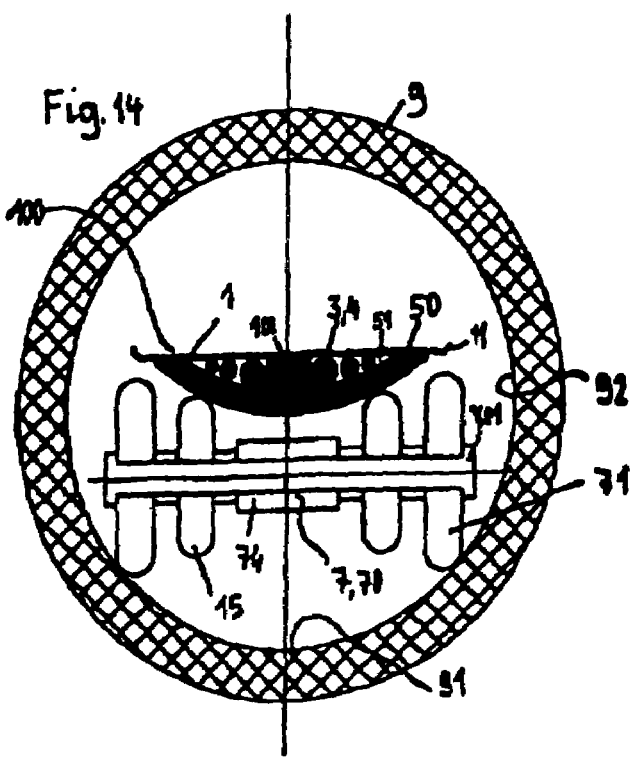
FIG. 14 is a diagrammatic, sectional view of the link wagon of the carrier band draw-in auxiliary train.

FIGS. 13 and 14 show (with otherwise the same reference numbers) an addition or auxiliary device for the cable-laying process that is advantageously used within the scope of the configuration according to the invention. It includes a cable draw-in auxiliary train 70 formed with several link wagons 7. The individual link wagons 7 thereof are configured with a wagon body 74 having an axle 701 which supports a pair of larger wheels 71 that are spaced from one another on the outside and provided for the travel of the auxiliary train 70 in the sewer pipe 9, and two independently rotatable carrier band supporting rollers 75 of a smaller diameter. The weighting elements 50 or the weighting body casing 55 with the carrier band 1 attached to it or them can be placed on these smaller supporting rollers 75 and ultimately drawn into the respective sewer pipe 9 with a relatively small resistance.

FIG. 13 shows two link wagons 7 each articulated to one another via a guide pole 73 and a lock hinge 731 or the like in a top view.

FIGS. 15A, 15B, 15C and 15D show (with otherwise the same reference numbers) how first the ensemble 1-3, 4-50 of the carrier band 1, possible cable support 3, the cable 4 and the weighting elements 50 are first moved into the sewer pipe 9 on the supporting rollers 75 of the link wagons 7 coupled to form a cable draw-in auxiliary train 70 and how the ensemble is ultimately placed on the base 91 of the sewer pipe 9 when the auxiliary train 70 is drawn away under the ensemble 1-3, 4-50 held in longitudinal position by a guide rope 134.

FIG. 16 schematically shows (with otherwise the same reference numbers) the cable draw-in auxiliary train 70 in a top view, as it just happens to be situated in a curvature of a sewer pipe 9.

Figure 17:
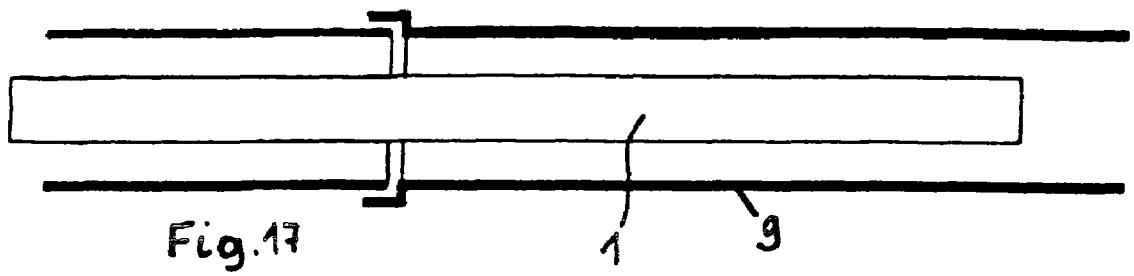
FIGS. 17 to 19 are diagrammatic, top plan views of three embodiments of the carrier bands on the link train.
Figure 18:
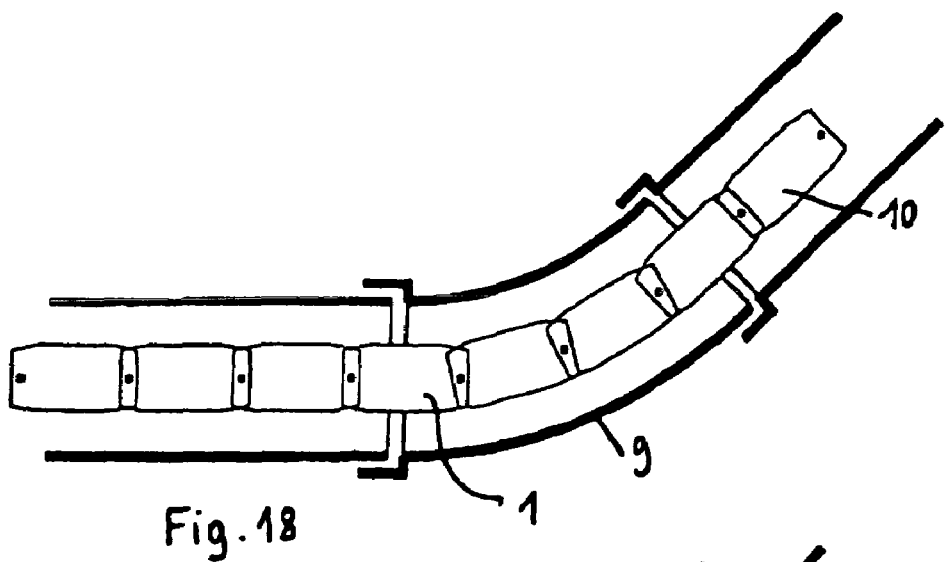
Figure 19:
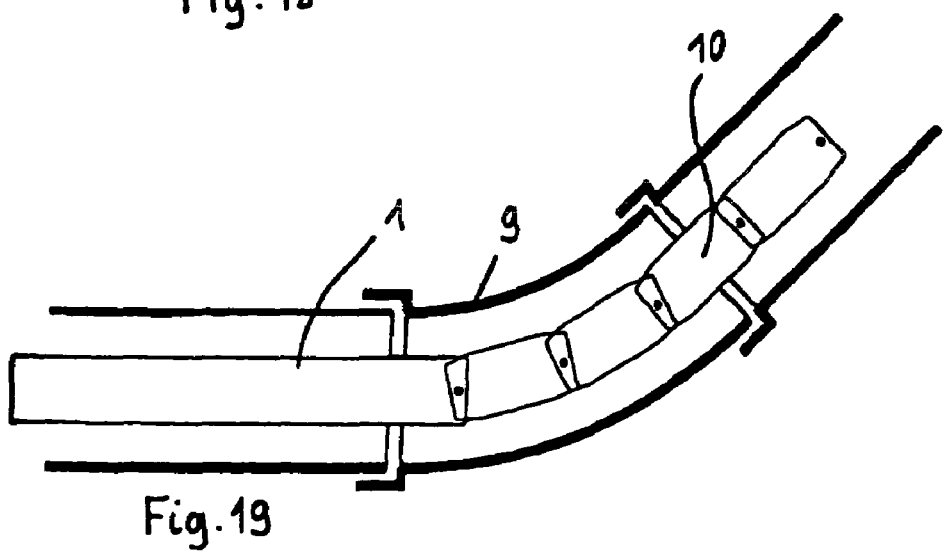

FIGS. 17, 18 and 19 schematically show (with otherwise the same reference numbers), in a top view, the configuration 100 according to the invention with the carrier band 1 that cannot be bent to the side in a straight sewer pipe section, furthermore, with a laterally deflectable carrier band 1 formed with a number of similar articulated band links 10 in a curvature and in a straight section of a sewer pipe 9 and the carrier band 1 formed with articulated band links 10 and a longer section 1 not laterally deflectable.

Figure 20A:
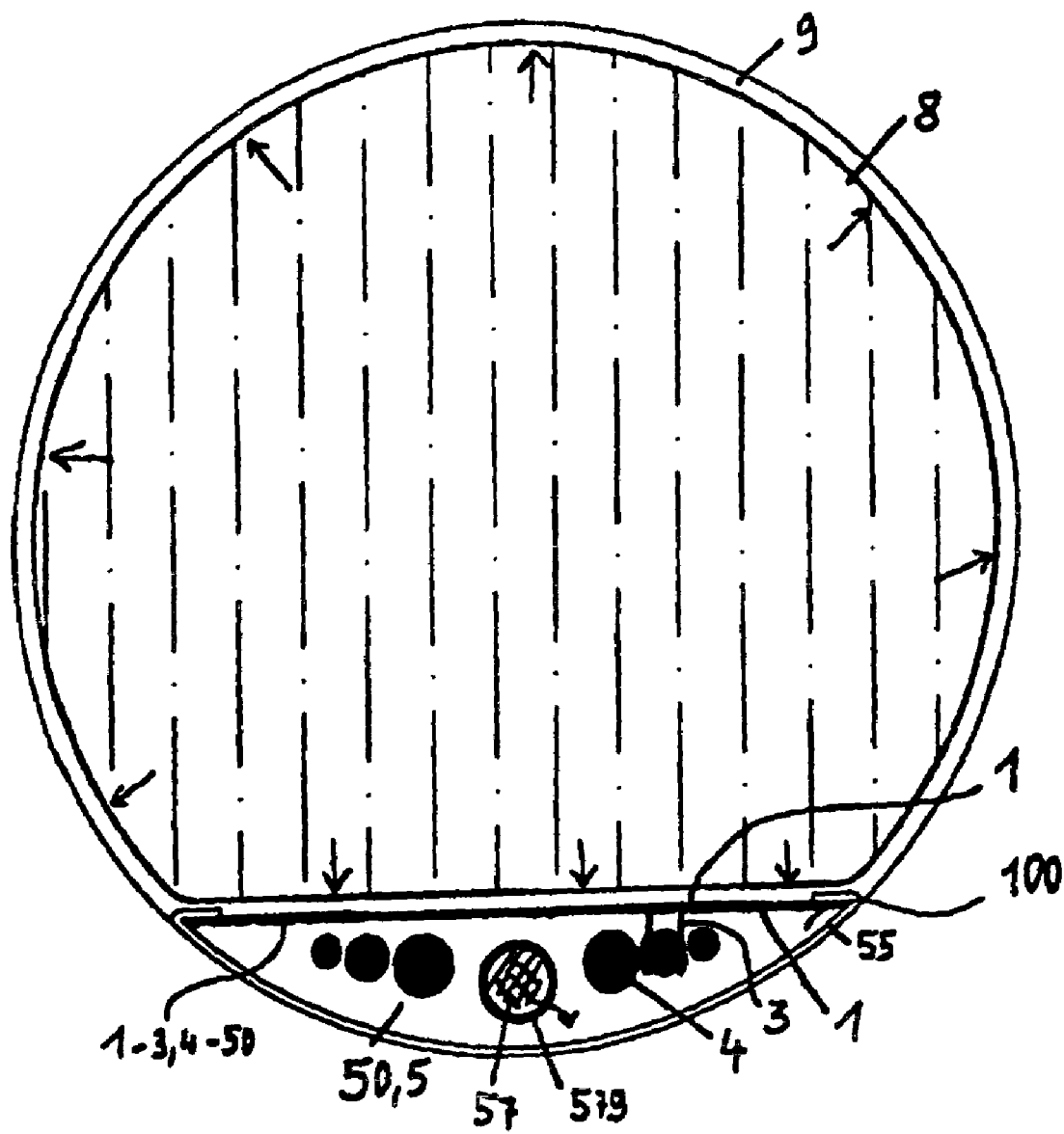
FIG. 20A is a diagrammatic, sectional view of a further auxiliary device for an accurate positioning of the new cable-laying configuration in the channel.
Figure 20B:
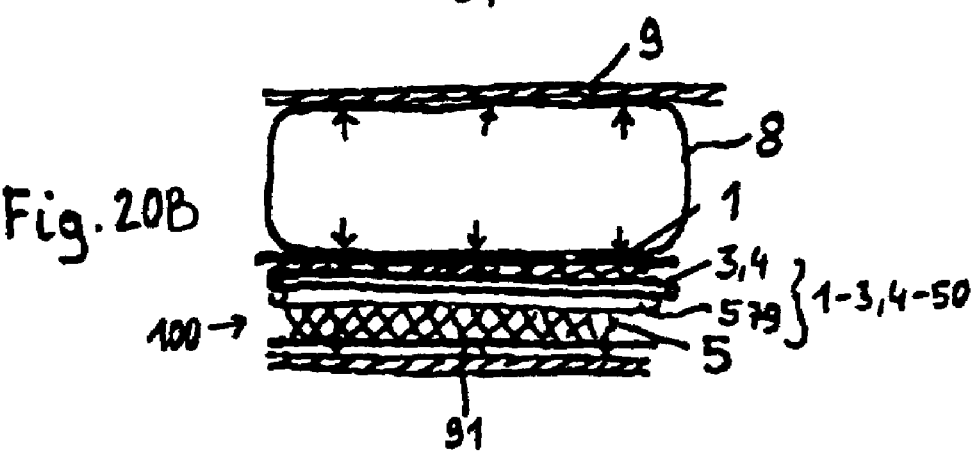
FIG. 20B is a diagrammatic, side sectional view of the further auxiliary device for an accurate positioning of the new cable-laying configuration in the channel.

FIGS. 20A, 20*b* schematically show (with otherwise the same reference numbers) a further auxiliary device provided to assist in the laying process, namely a tube body 8 which can be filled with air at a higher pressure, which, after the ensemble 1-3, 4-50 has been deposited for a position-accurate immobilization and for pressing them to the pipe base 91 prior to and during the pumping in of ultimately hardening flow binder 57 into the hollow interior space I of the weighting body casing or shell 55. If the binder 57 is pumped in there, then its weight is sufficient for the ensemble 1-3, 4-50 to remain in its weight-stabilized position and the tube body 8 can then be unloaded and brought to a different place for positioning of the just mentioned ensemble 1-3, 4-50 where the next in-situ filling with binder 57 takes place.

FIGS. 21A and 21B show (with otherwise the same reference numbers) in a horizontal and in a vertical longitudinal section, how a section 4' of an optical fiber cable 4 containing a sewer pipe section 9' is disposed with the carrier band 1 and with the weighting elements 50 on the underside and how the same is guided on the end of the carrier band 1 when the sewer pipe 9 is opened to an installation shaft 95 via the level of the carrier band 1 and finally a spherical curve is ultimately guided vertically ascending along on a wall section 952 opposite the just mentioned opening and how the cable 4 or the returning cable section 4" of the loop returns extending vertically downward on the diametrically opposite area of the shaft wall 952 and again reaches under a second section 1" of the carrier band 1 with the weighting elements 50 via a spherical curve.

The views shown in FIGS. 21C to 21F of the sections A-A, B-B, C-C noted in FIG. 21B show the path of the cable 4 or of its sections 4', 4" at various intersecting positions in detail and show how the area of the installation shaft 95 is covered vis-à-vis the bottom of the channel by specially curved cover elements 160 made of steel, sheet metal, polyester or epoxy resin of the installation shaft 95 and that, at the same time, the mounting support of the curved cable sections 4', 4" of the cable 4 is ensured.

This spatially curved cover element 160 has lateral supporting edges 161 with which it lies on the horizontal bottom 951 of the installation shaft 95.

The configuration according to the invention assists in overcoming the problem which occurs due to the fact that, especially when the configuration is drawn into channels or pipes of a smaller cross section, the difficulty arises that a relatively strong curvature or a slight curvature radius in a vertical direction, i.e. first when drawing in from an e.g. almost horizontal path from the surface into an essentially vertical path in a sewer access shaft and then when returning from this shaft into the channel that is horizontal again. In this process, the carrier band and the flexible weighting body have various radii of curvature, whereby the curvature radius of the weighting body is smaller when the configuration is drawn into the shaft than that of the carrier band, while when returning from the channel shaft into the channel, the curvature radius of the carrier band is smaller and that of the continuous weighting body being larger. Consequently, it is important for the draw-in process that the weighting body is connected with the carrier band in a manner that enables a relative longitudinal movement of the weighting body compared to the carrier band. Of course, this is also advantageous for lateral curvatures. It is now assured in the present invention that this mutual bending is substantially simplified in that the weighting body is disposed in a relatively movable manner vis-à-vis the carrier band.

It is especially advantageous if, the carrier band is formed with articulated band links, whereby almost any curvy longitudinal path of the pipe or channel can also be accomplished when drawing in the carrier band with the cables and the at least one continuous weighting body.

A configuration for cable laying is distinguished especially by a high position stability, in which the weighting body lies on the channel sole or on the pipe base or another configuration in which the continuous weighting body is attached to the carrier band supported on both sides of the pipe walls, namely to the underside of the carrier band, so-called "suspended" and pressed with its lateral edges relatively firmly against the inner wall surface of the pipe or channel by its weight.

In a configuration according to the invention, it is ensured with a high degree of certainty that the weight of the weighting body and the friction fit between its underside and the pipe base or the channel sole or between the lateral edges of the carrier band and the inside of the pipe or channel wall is fully sufficient for an actual stationary and lasting stabilization of the configuration without any additional auxiliary aids for fastening them inside the pipe and, as was found, the new construction also meets the demands made on it there under more difficult conditions in channels or channel sections with a relatively large slope and thus high rate of flow of the water, waste water or the like.

A configuration having a cable or the like made of steel or the like as a weighting body is especially simple to handle in the cable laying process.

In particular, an easily conveyable, free-flowing mineral-based sands, granular material or pellets with a density higher than quartz are suitable as fillers for the weighting body in the form of a material-fillable flexible pipe or tube, i.e. preferably tubes that are based on barium oxide, ferric oxides, in particular hematites, iron slag or the like, in some circumstances also lead pellets.

A substantial advantage of the new cable-laying configuration is that, in one embodiment thereof in which the carrier band adjoins more or less fully the inner wall of the channel or pipe with its two lateral edges, it can also in addition assume the function of a type of flat channel sole to stabilize the position of the cable by the at least one continuous weighting body on the underside of the carrier band at the top. This second sole has the advantage that it is more or less even and comparatively smooth, which reduces the friction of water or waste water when flowing through and its flow rate is increased so that the flow cross section reduced by the new cable-retaining configuration deposited on the pipe base or channel base is compensated by the higher flow rate. Furthermore, the clearing operations, which must also be carried out substantially less often, can be facilitated by the flattening obtained with the second sole, since the tendency for thick or solid deposits and precipitates is reduced substantially due to the relatively smooth surface of the carrier band. In addition, there is the further advantage that fine (sludge) particles contained in the waste water reach below the carrier band in spite of the adjoining of the lateral edges to the pipe interior and that, in the course of time, all cavities present there between the underside of the carrier band and pipe base become clogged and ultimately form a compact fill substance which further increases the friction fit between the configuration and the sewer pipe substantially contributing to the stabilization of the position, as already discussed above.

With respect to the connection of the carrier band with the weighting body or with its retaining elements, this can be accomplished by a simple screwing or by adhesion, (plastic) welding or the like.

Within the meaning of the invention, it is especially advantageous if, the weighting body is connected to the underside of the carrier band and attached by the same clamp-like or jaw-like weighting body retaining elements.

At this point, it is stressed that it is in no way imperative that the carrier band be configured "flat".

In particular for the case that the cables, fiber optic cables or the like are only to be laid in a section of a sewer pipe, i.e. that these cables are laid via an vertical shaft into the sewer pipe and then placed, together with the continuous weighting body, extending under the carrier band and then led upward after a certain path out of the channel via a shaft, i.e. from below the carrier band upward, it is advantageous if a dry-weather gutter is inserted into the carrier band, preferably in the middle, which is advantageously configured in such a way that its underside lies on the pipe base or on the channel sole, at least indirectly. In this case, cable holders and weighting body retaining elements are then configured in such a way that the cables are each arranged—for the most part on both sides—on the side of their dry weather gutters under the carrier band. The purpose of the gutter in the carrier band is now described.

Of course, since the carrier band is disposed only along a section of the sewer pipe where the cables are laid, and the carrier band is however arranged at a distance above the channel sole or channel base, inclined ramp sections which ascend onto the carrier band and again descend from the carrier band back to the sole or base are arranged at the start and at the end of the laying path.

In the area thereof, especially with low flow rates of the waste water in dry weather periods, sludge and the like is deposited which can lead to disintegrations of the pipe or channel. Due to the dry weather gutter inserted in the carrier band, which forms a type of second sole of the channel, the waste water does not have to overcome the just mentioned carrier band inclined ramps and, moreover, a sufficiently high flow rate is ensured there, even with low amounts of waste water in dry weather periods due to the low flow-through cross section as a result of which the aforementioned deposits of sludge or the like are prevented.

According to a further simple embodiment, the retaining elements for the weighting body and the cable or cable tube holder for guiding and accommodating the cables or tubes into which cables, in particular optical fiber cables, can be drawn or blown in, can be configured as one piece.

A configuration of the weighting body retaining elements or the cable holder already made as one piece with them at uniform distances in the longitudinal direction of the carrier band is advantageous.

An advantageous embodiment is for a one-piece weighting body retaining elements and the cable or sewer pipe holder with base plate and weighting body and cable-retaining clamps protruding away from them. With regard to the retaining clamps for the weighting body and for the cables, in particular with regard to the weighting body, it should be noted that it is advantageous if the weighting body is disposed closer to the inner wall of the channel or pipe or even abutting them with its casing section directed downward to the pipe base. However, the ends of the retaining clamps of the weighting body retaining elements have a greater distance to the inner wall surface of the pipe or channel, so that it is certainly prevented that these clamps or the ends of these retaining clamps come into contact with the pipe base when the entire cable-laying configuration is drawn in since, in this case, the friction resistance is increased considerably during the drawing in and therefore the drawing in of the laying configuration results in problems.

An especially advantageous embodiment of the configuration of the weighting body retaining elements and the cable or cable pipe holder are advantageously formed as one piece with them.

An embodiment of the retaining elements for the weighting body and the cable or cable-pipe holder, which is advantageously integral with them, as double or twin mounting supports are especially advantageous and preferable for drawing the new cable-laying configuration into the channel.

As discussed above, to facilitate the longitudinally relative displacement between the carrier band and the weighting body as well as optionally also the cable, due to the various radii of curvature, which occur when the cable is drawn in via the manhole, a lubrication of the weighting body retaining elements and possibly also the cable and cable pipe holder is advantageous.

It is advantageous if the carrier band or its band links is/are formed from an elastic material that bends up or down diagonally to its longitudinal extension, in particular of plastic, in particular polyester or epoxy resin, of steel or steel plate or of a plastic/steel composite material.

Furthermore, it can be advantageous if, by flanging the lateral edges of the carrier band or the band members forming same, a full, flat fit thereof is obtained with the lateral edges against the inner wall surface of the pipe.

With a configuration having a carrier band whose lateral edges are surrounded with an edge-gripping band or the like, preferably made of plastic, drawing the carrier band into the pipe or into the channel with the continuous weighting body can be substantially facilitated by lowering the friction resistance of the lateral edges of the carrier band on the inner wall surface of the pipe or channel.

FIG. 22 shows how the carrier band 1, e.g. of high-grade steel, is drawn into a sewer pipe 9 in the cable-laying configuration 100 according to the invention and is placed in the sewer pipe 9 in such a way that it braces itself with its flanged lateral edges 11 on the concave inner wall surface 92 of the channel on both sides. Four clamping fixtures in total are disposed on the underside of the carrier band 1, on the right and left of the median plane for continuous bodies extending longitudinally and having an substantially round cross section, namely in the present case, three holders 3 with retaining clamps 33 for mounting cables 4 or cable pipes which are provided for drawing in or blowing in special cables, e.g. optical fiber cables or the like, furthermore, a weighting body retaining element 35 with which continuous weighting bodies 5 which also have a substantially circular cross section are clipped into it in the same manner as the previously noted cables 4 or cable pipes. The weighting body 5 shown here contains a weighting body casing 51 formed from a flexible pipe or tube, e.g. of a polymer material which is filled with a free-flowing material 52 having as high a density as possible, e.g. in the form of sand or pellets. Instead of a continuous two-component weighting body 5 as just described, a "single component" body 5 of this type can be provided which is formed in this case, for example, out of a twisted steel cable.

In the case shown in FIG. 22, the cable holders 3 and the weighting body retaining element 35 are formed as a dual holder 335 in one piece, whereby a base plate 351 is connected to the underside 101 of the carrier band 1 by screws 102 or the like. The one-piece, spring-flexible cable retaining clamps 33 and weighting body retaining clamps 353 each protrude downward in pairs with it from the base plate 351. In the configuration 100 shown, the retaining clamps 33, 353 disposed between adjacent cables 4 or cable pipes and the weighting body 5 in each case are configured integrally, so to say, in a double function with one another, and only divide at their ends in the shape of a Y. The cables 4 and the continuous weighting body 5 described above are inserted between the aforementioned clamps 33, 353 in the manner of a snap-in mounting fixture and are held in position by the forked ends of the aforementioned clamps 33, 353. Furthermore, it can be seen in FIG. 22 that the slight distance a of the weighting element 5 from the inner wall surface of the sewer 92 is less than the distance b between the ends of the retaining clamps 33, 353 from the aforementioned inner pipe wall 92. It is thus ensured that, in the event that the new cable-laying configuration 100 comes into contact with the inner wall surface 92 of the sewer pipe, that only the weighting body 5 always comes into contact with it, so that the sliding drawing of the new cable-laying configuration 100 into the respective sewer pipe is ensured without great friction losses. Namely, if the Y-like divergent ends of the retaining clamps 33, 353 were to reach closer to the inner wall surface of the channel than the weighting element 5, then these ends would so to say be "pinned" there in a frictional manner on the inside of the channel wall 92 when the new cable-laying configuration 100 is pushed in and in this way resist being drawn into the channel.

FIG. 23 shows (with the otherwise same reference numbers) a preferred embodiment of the retaining elements 3, 35 within the scope of the invention, in the form shown in FIG. 22 of the dual holder 335 for the weighting body 5 and for the cables 4 or cable pipes in detail. It is shown how a base plate 351 is disposed on the underside 101 of the carrier band 1 formed with articulated band links 10 by axis Δ from which two series of weighting body retaining elements 35 and cable or cable pipe holders 3 with their respectively common retaining clamps 33, 353 protrude in longitudinal direction of the carrier band 1, shown by an arrow, each behind one another, between which the cables (not shown here) and the continuous weighting body (also not shown) are ultimately inserted.

In the embodiment of the configuration 100 according to the invention shown in a rough outline in FIG. 24 (with otherwise the same reference numbers), the carrier band 1 contains band links 10 flexibly connected to one another via articulated joints. The cable holder 3 and the weighting body retaining elements 35 are disposed with the two series of the retaining clamps 33, 353 protruding away from the base plate 351 of the dual holder 335 at the axis Δ of the articulated joints shown. Furthermore, it is shown with dash-and-dot lines what the position of the holder 335 is when the carrier band 1 deforms vertically when the new cable-laying configuration is drawn into a channel. A continuous holding and guiding of the cable and weighting body is ensured by the dual holder 335. Since the holder 335 is formed from an inherently hard, yet simultaneously flexible material, it can so-to-say also carry out the curvature, in particular also with a concave curvature of the carrier band 1, and thus also ensures a continuous run of the cable and the weighting body along the carrier band when the new cable-laying configuration 100 is drawn into a channel.

Figure 25:
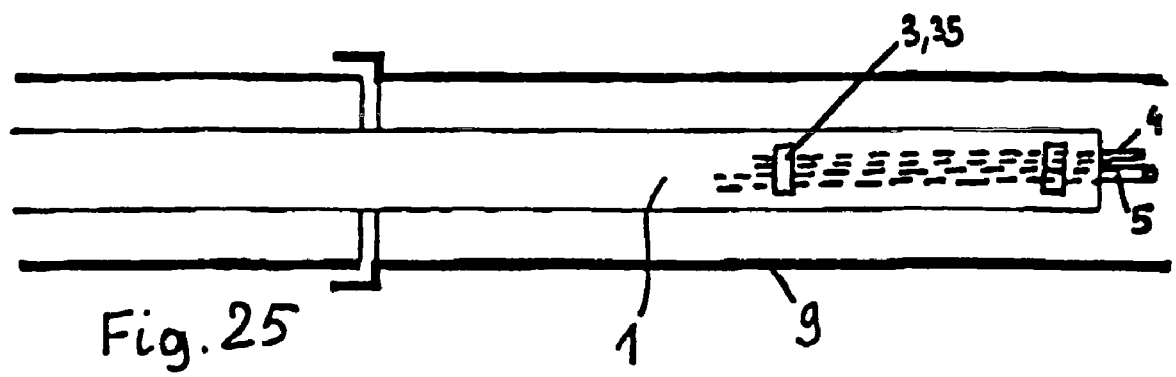
FIGS. 25 to 27 are diagrammatic, plan views of the carrier band in three different embodiments which is provided for laying the cables in pipe channels and on the underside of the carrier band are the weighting retaining element and the cable holder.

FIG. 25 schematically shows in a top view (with otherwise the same reference numbers) the cable-laying configuration 100 according to the invention with a laterally, yet not vertically up and down bendable carrier band 1, e.g. made of steel, in a straight pipe section.

Figure 26:
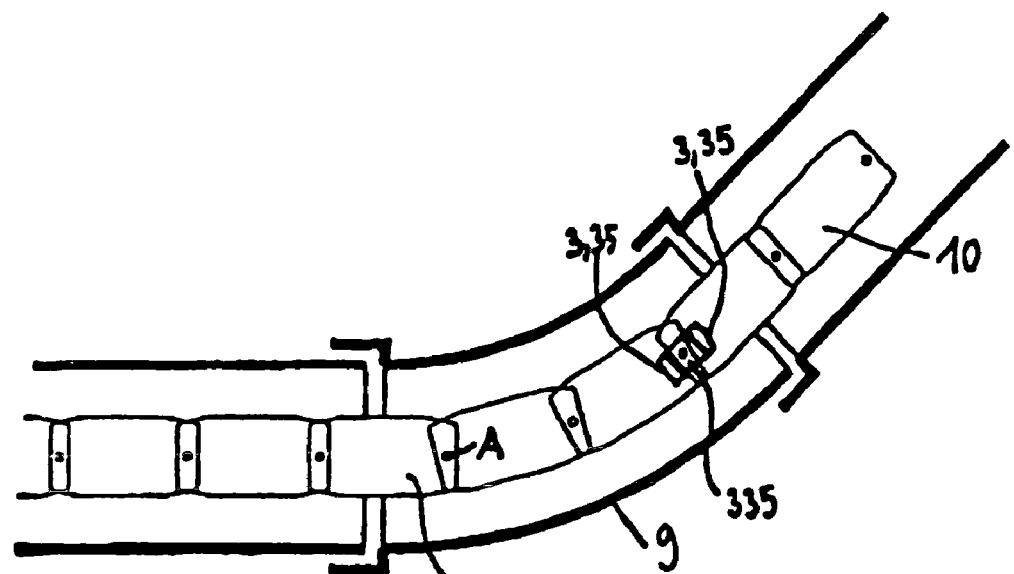
Figure 27:
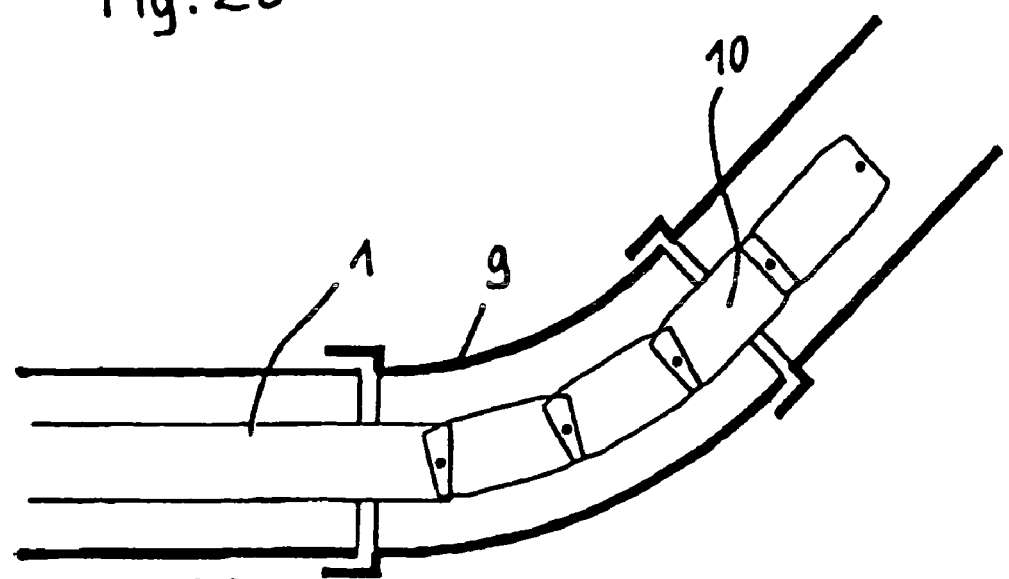

FIG. 26 shows a laterally deflected carrier band 1 formed with similar, articulated band links 10 in the curvature of a sewer pipe 9 and FIG. 27 a carrier band 1 formed with articulated band links 10 and a longer straight section, that cannot be laterally deflected, in a straight section of a sewer pipe 9, which then passes into a curvature.

FIGS. 28 and 29 show (with otherwise the same reference numbers) an additional or auxiliary device advantageous for use within the scope of the configuration 100 according to the invention for the cable-laying process. It contains a cable draw-in auxiliary train 70 formed with several link wagons 7. The link wagons 7 are each configured with a wagon body 74 having an axle 701 which supports a pair of wheels 71 that are spaced from one another on the outside and provided for moving the auxiliary train 70 in the sewer pipe 9, and two independently rotatable carrier band supporting rollers 75 disposed between them. The carrier band 1 carrying the weighting body 5 and the cables 4 on the underside can be placed on these supporting rollers 75 and drawn into the respective sewer pipe 9 with little resistance.

FIG. 28 shows two link wagons 7 articulated to one another via a guide pole 73 and a lock hinge 731 or the like in a top view.

FIGS. 30A and 30B show (with otherwise the same reference numbers) how first the ensemble 1-3,35,4-5 of the carrier band 1, cable support 3, weighting body retaining element 35, cable 4 and weighting body 5 are first moved into the sewer pipe 9 on the supporting rollers 75 of the link wagons 7 coupled to form a cable draw-in auxiliary train 70 and how the ensemble 1-3,35,4-5 is ultimately placed in the sewer pipe 9 when the auxiliary train 70 is pulled away under the ensemble 1-3,35,4-50 held in longitudinal position by a guide rope 134 or the like.

FIG. 31 schematically shows (with otherwise the same reference numbers), in a top view, the cable draw-in auxiliary train 70 as it is just in a curvature of a sewer pipe 9.

Figure 32A:
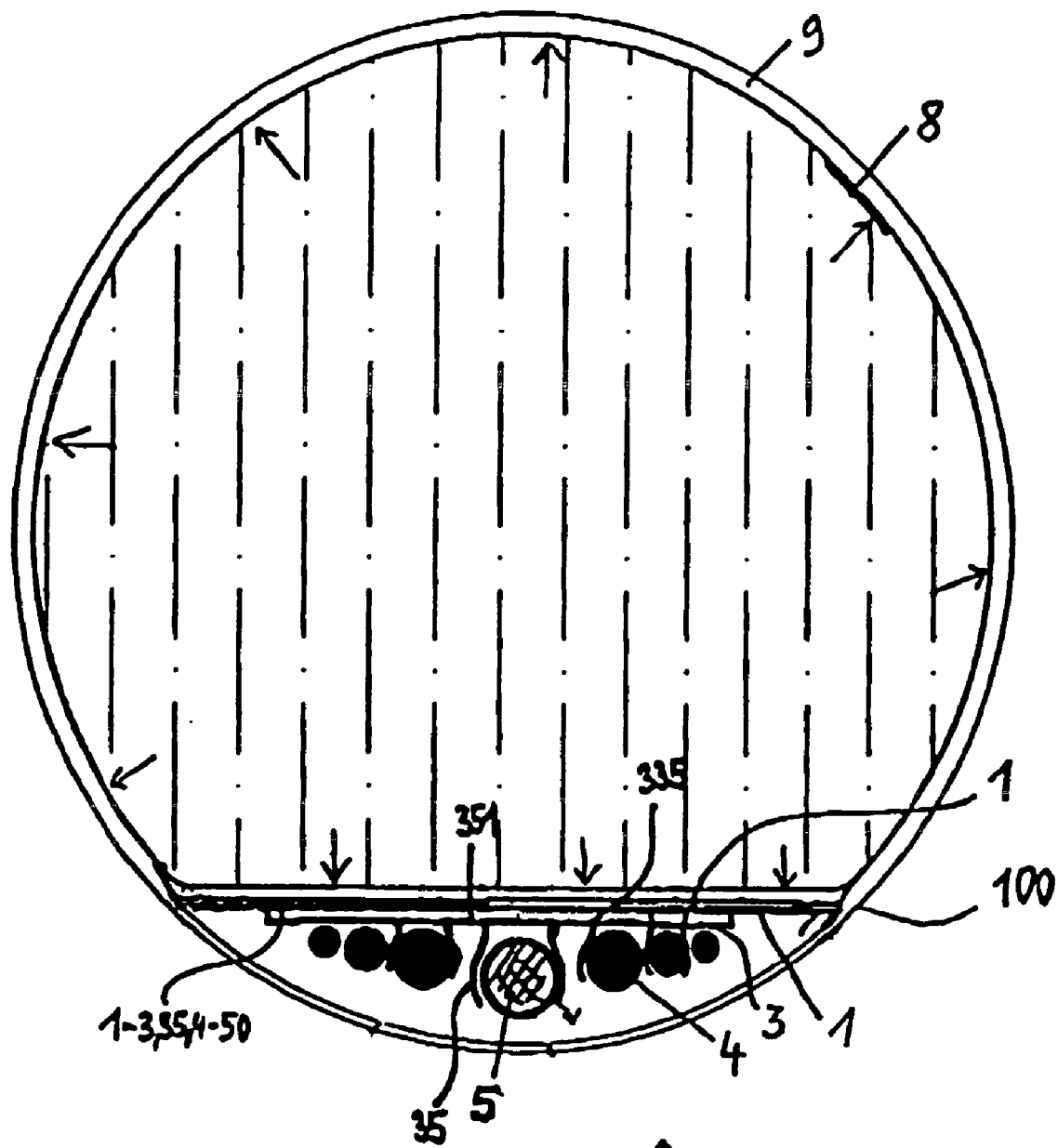
FIG. 32A is a diagrammatic, sectional view, of a further advantageous auxiliary device for an accurate positioning of the new cable-laying configuration in a pipe or channel.
Figure 32B:
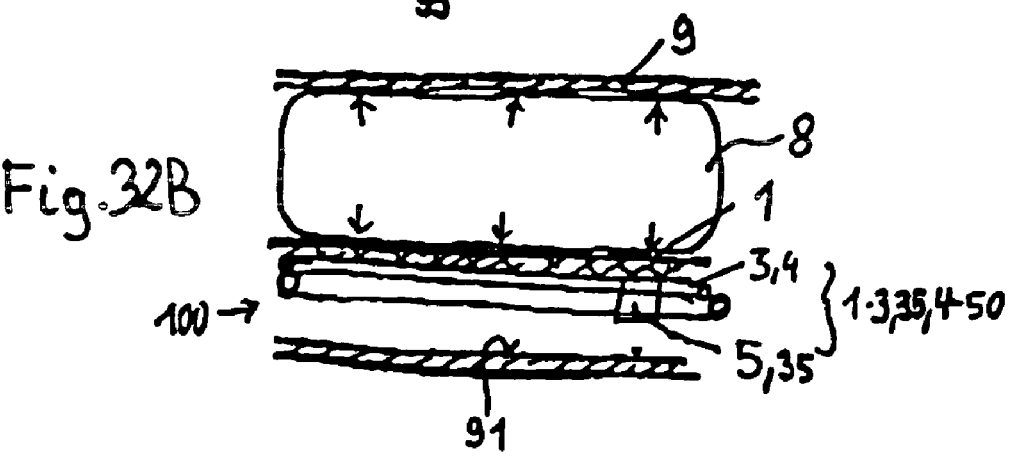
FIG. 32B is a diagrammatic, side view of the further advantageous auxiliary device for an accurate positioning of the new cable-laying configuration in a pipe or channel.

FIGS. 32A and 32B schematically show (with otherwise the same reference numbers) a further auxiliary device provided to assist in the laying process, namely a tube body 8 which can be filled with air at increased pressure, which, after the ensemble 1-3, 4-50 has been deposited for a position-accurate immobilization and for pressing them to the pipe base 91 prior to and during the introduction of the weighting material 52 into the interior of a weighting body casing tube 51. If the weighting material 52 is inserted there, then its mass or weight is sufficient for the ensemble 1-3,35,4-5 to remain in its weight-stabilized position and the tube body 8 can then be unloaded and brought to a different place for positioning of the just mentioned ensemble 1-3,35,4-5 where the next in-situ filling with weighting material 52 takes place.

FIG. 33 shows (with otherwise the same reference numbers) an embodiment of the carrier band 1 of the configuration 100 according to the invention which is not flat but configured with a dry weather gutter 110 disposed in the middle and here lies on the pipe base 91 with insertion of the weighting body retaining element 35 formed with a base plate 351 adapted to a corresponding cross sectional shape and made in one piece with the cable holder 3.

A continuous weighting body 5 is disposed on both sides of the gutter 110 in the free spaces there between the underside of the carrier belt 101 and the inner wall surface of the pipe 92 as well as on both sides of the cables 4. The small drawing within FIG. 12 schematically illustrates a position of the configuration 100 according to the invention where it ends within the sewer pipe 9 and e.g. a cable 4 is led upward from below the carrier band 1 through a lateral recess therein, out of it and into a manhole of the like (not shown in greater detail).

At its end, the carrier band 1 passes over into an end ramp 111 leading downward diagonally to the pipe base 91. It can be seen in the drawing how the dry weather gutter 110 is continued more or less at the level of the pipe base 91 and the waste water does not therefore have to overcome the end ramp 111 when only small amounts occur in dry periods, and it is thereby avoided that sludges or the like collect and can perhaps result in obstructions in the area of this ramp 110 due to too little amounts of waste water and flow rate.

The cable-laying configuration according to the invention is characterized in that such a high proper mass is given to the links of the carrier band itself, i.e. that they are themselves so "heavy" that no additional steps must be taken for the stationary and stable positioning—and remaining in position—even during high waste water flow rates in the channel, e.g. during bad weather, i.e. no anchoring is required in the waste water pipe or channel wall, but also no weighting elements that ensure that they remain in position once the cable has been placed in the channel, but that it is assured solely by the specific gravity of the carrier band or the ensemble of carrier band and cables or the like fastened to it on the underside.

A second feature of the invention is in the configuration of the central gutter inserted in the carrier band. An advantage of the central gutter in the carrier band, which ensures that it remains in position, is now described.

The carrier band braces itself with its lateral edges—weighted by specific gravity—on the opposite concave inner surfaces of the respective (waste) water pipe or channel on both sides and thus offers quite a substantial resistance to a change in position of the carrier band and the cable or the like extending below it.

Furthermore, the great advantage of the carrier band abutting the inner walls of the channel in a highly friction resistant manner on both sides by specific gravity in the described manner is that it forms a type of second sole of the channel which is disposed above the pipe base or the channel sole and in this way offers little opportunity for sludge or deposits to settle.

Nevertheless, of course, the carrier band is only disposed along a section of the sewer pipe there where the cables or the like are actually laid and, however, the carrier band is disposed at a distance above the channel sole or the channel base, as just described, so that the channel water flow ascends, so to say, on the carrier band at the start of the laying path and then should descend again at the end thereof from the carrier band back to the channel sole. In particular at the start of the laying path, sludge and the like is deposited at low flow rates of the waste water, e.g. in warm-rain dry weather periods, which can ultimately lead to disintegration of the pipe or channel. Due to the central gutter inserted in the carrier band, forming a type of second sole of the channel, which forms a dry weather gutter, the waste water does not have to overcome the difference in height between the channel sole and carrier band level, but can continue to flow at the same level, and, moreover, even with low amounts of waste water in dry weather periods, a sufficiently high flow rate is ensured by the central gutter due to their small flow-through cross section, as a result of which the deposit of sludges or the like is prevented.

In the course of exhaustive tests in practice, it was found that an especially high specific gravity of the carrier band is not required to ensure a weighting that guarantees the fixed position of the laid cable, but that already relatively small differences between the (low) density of the (waste) water flowing in the channel and the (higher) "average density" of the carrier band cable ensemble in the range of 3 and 25 percent is definitely sufficient for obtaining this objective.

An embodiment of the invention brings the advantage that only a very slight, i.e. almost no "graduation" is given which promotes undesirable obstructions between the actual pipe base and the bottom of the central gutter of the carrier band.

To increase this advantage, it can be advantageous to keep the material thickness of the carrier band links lower, at least on the bottom of the central gutter, than in their shoulder zones.

If an "up and down swivel feature" or flexibility of the band links of the new carrier band is provided, then, on the one hand, there is no problem to roll up the carrier band on a spool or drum, which is advantageous, on the one hand, for transport and also for the laying logistics, and, on the other hand, it is easy to handle the transitions during laying from e.g. vertical channel shaft into an essentially horizontally extending sewer pipe.

With respect to the flexible connection of the individual band links, limits are only set here due to a too high expenditure during production of the carrier band and by the formation of possible projections of joints or the like which restrict or disturb the free flow of waste water that could promote obstructions of the channel.

A somewhat more expensive and more flexible embodiment of the carrier band, which can however more easily manage "horizontal" lateral curvatures in channels, which is based thereon that, although the band links on the longitudinal filaments connecting them to the carrier band are heavy to a slight extent, they can be moved relatively well.

At this point, it should be noted that the dimensions of the band links that have proved successful in practice have e.g. 20-50 cm or 25-35 cm in length and that the distances thereof from one another can be between 2 and 10 mm, in particular 2 to 50 mm.

FIG. 34 shows how the carrier band 1 formed with the band links 10 placed in a row along one another and here articulated by of rings 102 is deposited with a proper mass Em producing its "self-weighting" in the new cable-laying configuration 100 in a sewer pipe 9. The cross section of the carrier band 1 or of its band links 10 shows flat shoulder zones 110' which descend from the two lateral edges 11 adjoining the inner wall 92 of the pipe to the band center or median zone Mz, each extending at the same level height, forming the side zones Sz, which pass over into the central gutter 110 having rounded edges here and a wide U-shaped cross section, the underside of which is shown positioned just above the pipe base 91. It is often advantageous if the central gutter 110 lies on the pipe base 91 on the underside.

Optical fiber cables 4 or the like, laid in the sewer pipe 9 and fastened here by clamp-like cable holders 3 (only indicated here) extend below the two shoulder zones 110' with the width bs. For example, the band links 10 have a link length gl of 25 cm and a distance ag of 2 to 5 mm from one another.

FIG. 34 clearly shows the material thickness md or strength of the carrier band 1 forming its own weighting body (Bk) by which the specific gravity thereof is guaranteed which ensures the necessary weighting of the carrier band 1, cable 4 ensemble, suppressing undesirable displacements of the cable 4 in the waste water and the uplift through the waste water flow.

FIGS. 35A, 35B and 35C show (with otherwise the same reference numbers), in views from the bottom, from the side and in section, a short section of a carrier band 1 according to the invention whose band links 10 are joined by e.g. spot welding, on the bottom on the same joined (endless) steel band (500). FIG. 35B shows the mutual "up/down flexibility" of the band links 10 of the carrier band 1.

FIGS. 36A, 36B and 36C show (with otherwise the same reference numbers), in a view from the bottom, from the side and in section, how two steel cables 500 provide the flexible connection of the band links 10 which are interconnected on the underside with the band links 10 via retaining clamps 501 which surround these cables 500 with a higher frictional resistance. Thus, the band links 10 are not fixed but can be moved on the cables 500 with more or less resistance and in this way also enable, as FIG. 36A shows, a lateral curvature or bending of the carrier band 10.

FIG. 37 schematically shows (with otherwise the same reference numbers) the unwinding process when laying cables using the carrier band 1 according to the invention from a cable-laying drum Vt in a manhole Ks (diagonal here).

The carrier band 1 with its band links 10 is wound on the drum Vt in such a way that it points outward with its underside Us or that it points or they point radially outward into the same inserted central gutter 110.

Figure 39:
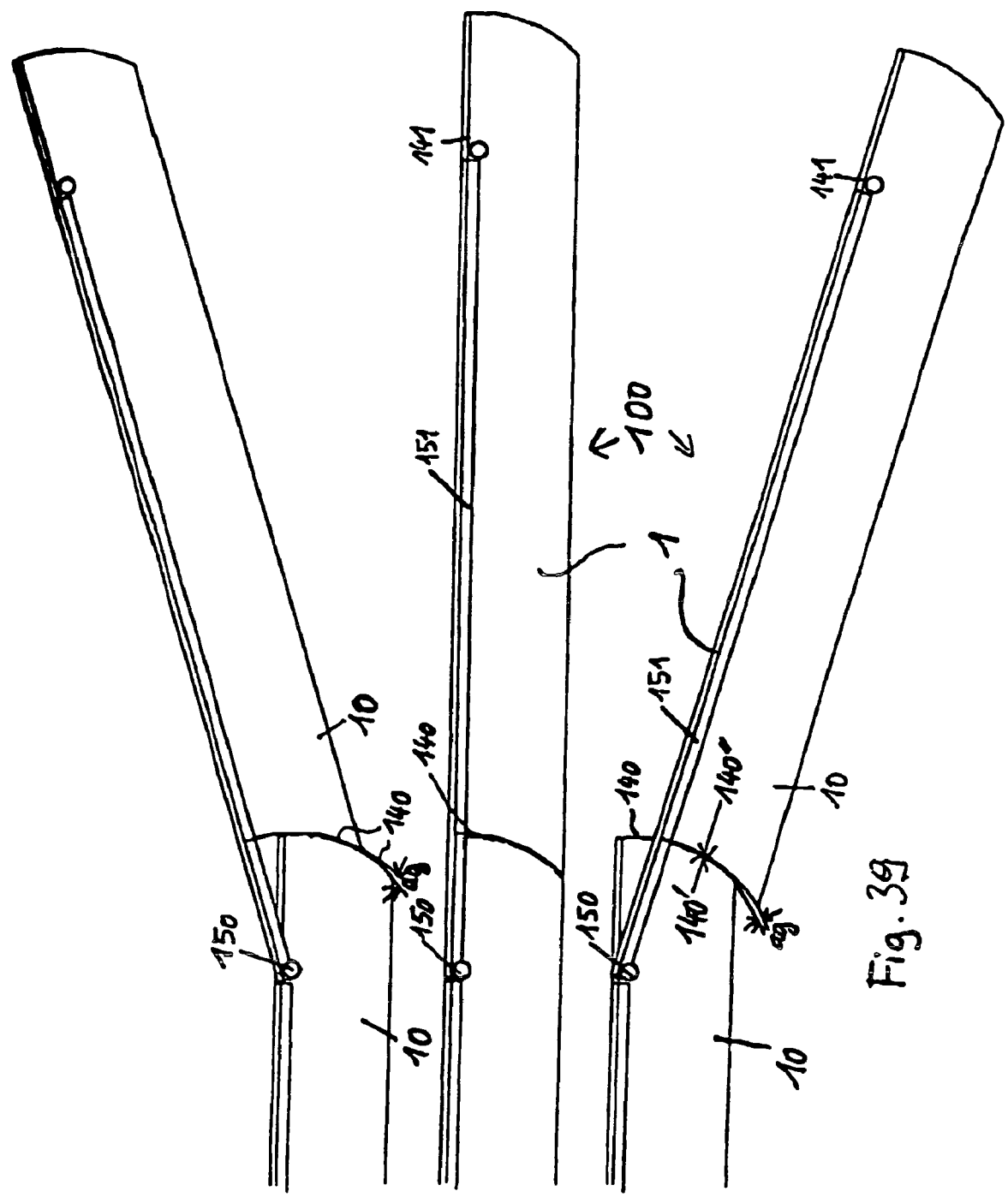
FIG. 39 is a diagrammatic, side view of the carrier band.

FIGS. 38 and 39 show advantageous further developments of the invention in which the carrier band 1, in the event that it does not have sufficient proper weight or density of the material forming it, it is constructed with articulated, flexible or the like carrier band links 10 having an outer contour Ka on the underside corresponding to the inner cross sectional contour Ki of the pipe 9, channel or the like, adapted essentially to the same form, for a close fit on the channel or pipe base 91, and that at least one of the shoulder zones 110 on both sides is configured with chambers 120, 130 closed by a bottom wall 119 each which is formed according to the aforementioned outer contour Ka in the form of a downward direction, from which the cable running chamber(s) 120 are open on both sides the configuration of the cables 4 or the like to be laid in direction of the longitudinal extension of the carrier band and which, preferably, form a longitudinal wall 132 together with the just noted cable-running chamber(s) 120 which have weighting chamber(s) 130 which are substantially closed on all sides and with a filling hole 131 which is preferably closable or sealable so as to be watertight and weighting bodies having a density exceeding the density of water by at least 50% and, preferably, a density of more than 2.5 g/cm$^3$, as filled at least partially in particular with tube of heavy minerals such as barium oxide, hematite, iron or the like.

We claim:

1. A cable laying configuration disposed in a conduit selected from the group consisting of galleries, tunnels, shafts, pipes, and channels, the configuration comprising:

at least one cable selected from the group consisting of electric cables, data and information transport cables, control cables, fiber optic cables, and fluid transport tubes, said cable said being unwound from a drum from a region of an opening providing access to an installation shaft or access shaft toward a respective pipe or channel, or drawn or fixed in a stationary manner in the pipe or the channel, a stationary positioning of said cable and the cable laying configuration being obtained and ensured by a force of gravity and a frictional fit thus arising with the pipe or channel;

a flexible and/or articulated carrier band having an underside and lateral edges, said carrier band to be pulled into the pipe or into the channel, disposed at a distance from a bottom of the pipe or from a channel sole and laid a against an inner wall surface of the pipe or the channel, adjoining both sides with said lateral edges, and forming a substantially flat second bottom in the pipe or the channel disposed above the pipe base and/or the channel sole; and at least one continuous weighting body having a plurality of weighting elements spaced from one another and disposed on the pipe base or the channel sole, said weighting body preventing said cable from floating up due to water or waste water disposed in the pipe or the channel;

said weighting body being suspended from said carrier band when said lateral edges of said carrier band are supported by the inner wall surface of the pipe or the channel.

2. The configuration according to claim 1, further comprising:

cable supports disposed on said underside pointing to the pipe base and/or the channel sole for mounting said cable; and.

3. The configuration according to claim 2, wherein one of said weighting body and said weighting elements have on a side facing the pipe base or the channel sole, a cross sectional contour corresponding to a form of the pipe base or the channel sole, so that said weighting body or said weighting elements can lie on the pipe base or channel sole.

4. The configuration according to claim 2, wherein one of said weighting body and said weighting elements are disposed suspended at a distance from the pipe base or from the channel sole, without being in contact with the pipe base of the channel sole, on which said carrier band is braced with said two lateral edges on a concavely bent inside wall surface of the pipe or the channel on both sides.

5. The configuration according to claim 2, wherein one of said weighting body and said weighting elements has recesses formed therein on sides pointing to said underside of said carrier band, said recesses having at least one cross-sectional form corresponding to a cross-sectional form of said cable or an envelope curve of a multitude of said cables.

6. The configuration according to claim 2, further comprising a fastener selected from the group consisting of screws and adhesives, at least one of said weighting body and said weighting elements being fastened to said underside of said carrier band by said fastener.

7. The configuration according to claim 2, further comprising fastening elements, one of said weighting body and said weighting elements being formed with a hardened binding agent selected from the group consisting of concrete and mortar mass, and fastened to said carrier band by said fastening elements.

8. The configuration according to claim 2, wherein one of said weighting body and said weighting elements is formed with an absorbent sponge or foam material attached to said underside of said carrier band, and saturated with an at first flowable and later hardening binding agent, said absorbent sponge or foam material having fundamental substances of an open-pore structure, suitable for a saturation with said binding agent.

9. The configuration according to claim 2, wherein said weighting body has an outer casing formed for attaching to the pipe base or to the channel sole, said outer casing formed of a permeable structure selected from the group consisting of a textile, a net, a fleece and an open-pore structure, said weighting body receiving a flowable weighting binder mass inserted into an interior space defined between said carrier band and said outer casing.

10. The configuration according to claim 2, wherein said carrier band is formed from a material that can be bent diagonally to its longitudinal extension, is elastic and can be bent up or down.

11. The configuration according to claim 2, wherein said two lateral edges of said carrier band are one of bent upward and flanged for a close fit laterally on the inner wall surface of the pipe or the channel.

12. The configuration according to claim 2, wherein:

said weighting body has weighting lateral edges; and said carrier band has retaining profiled bands, said weighting body is fastened to said underside of said carrier band by said weighting lateral edges and said retaining profiled bands engaging each other.

13. The configuration according to claim 2, wherein said carrier band has weighting body gripping zones, one of said weighting body and said weighting elements is fastened to said underside of said carrier band by said weighting body gripping zones formed on both of said two lateral edges of said carrier band, provided for a retaining grip of lateral edges of said weighting body or said weighting elements in a clipped on manner.

14. The configuration according to claim 2, wherein said one of said weighting body and said weighting elements has an outer casing with carrier band gripping zones formed on edges of said outer casing, said carrier band gripping zones gripping said lateral edges of said carrier band, at least one of said weighting body and said weighting elements is fastened to said underside of said carrier band by said carrier band gripping zone.

15. A cable laying configuration disposed in a conduit selected from the group consisting of galleries, tunnels, shafts, pipes, and channels, the configuration comprising:

at least one cable selected from the group consisting of electric cables, data and information transport cables, control cables, fiber optic cables, and fluid transport tubes, said cable said being unwound from a drum from a region of an opening providing access to an installation shaft or access shaft toward a respective pipe or channel, or drawn or fixed in a stationary manner in the pipe or the channel, a stationary positioning of said cable and the cable laying configuration being obtained and ensured by a force of gravity and a frictional fit thus arising with the pipe or channel;

a flexible and/or articulated carrier band having an underside and lateral edges, said carrier band to be pulled into the pipe or into the channel, disposed at a distance from a bottom of the pipe or from a channel sole and laid against an inner wall surface of the pipe or the channel, adjoining both sides with said lateral edges, and forming a substantially flat second bottom in the pipe or the channel disposed above the pipe base and/or the channel sole;

cable supports disposed on said underside pointing to the pipe base and/or the channel sole for mounting said cable; and at least one continuous weighting body having a plurality of weighting elements spaced from one another and disposed on the pipe base or the channel sole, said weighting body preventing said cable from floating up due to water or waste water disposed in the pipe or the channel;

wherein one of said weighting body and said weighting elements is formed with an outer casing fastened to said carrier band and having a cross-sectional contour that corresponds to a cross sectional contour of the pipe base or the channel sole, and that an interior space of one of said weighting body and said weighting elements formed between said underside of said carrier band and said outer casing is filled with a pourable and/or freeflowing and/or at first free-flowing and then hardening material having a high average density of more than 2.5 $g/cm^2$, with crushed stone and/or heavy mineral sand and/or with a binding agent selected from the group consisting of concrete and mortar mass.

16. The configuration according to claim 15, further comprising:

mounting fixtures; and a feed tube attached to said underside of said carrier band by said mounting fixtures, said feed tube introducing the binding agent, into said interior space between said carrier band and said outer casing of said continuous weighting body.

17. A cable laying configuration disposed in a conduit selected from the group consisting galleries, tunnels, shafts, pipes, and channels, the configuration comprising:

at least one cable selected from the group consisting of electric cables, data and information transport cables, control cables, fiber optic cables, and fluid transport tubes, said cable said being unwound from a drum from a region of an opening providing access to an installation shaft or access shaft toward a respective pipe or channel, or drawn or fixed in a stationary manner in the pipe or the channel, a stationary positioning of said cable and the cable laying configuration being obtained and ensured by a force of gravity and a frictional fit thus arising with the pipe or channel;

a flexible and/or articulated carrier band having an underside and lateral edges, said carrier band to be pulled into the pipe or into the channel, disposed at a distance from a bottom of the pipe or from a channel sole and laid against an inner wall surface of the pipe or the channel, adjoining both sides with said lateral edges, and forming a substantially flat second bottom in the pipe or the channel disposed above the pipe base and/or the channel sole;

cable supports disposed on said underside pointing to the pipe base and/or the channel sole for mounting said cable; and at least one continuous weighting body having a plurality of weighting elements spaced from one another and disposed on the pipe base or the channel sole, said weighting body preventing said cable from floating up due to water or waste water disposed in the pipe or the channel;

wherein said carrier band is formed with a plurality of articulated band links which can be swivelled vis-à-vis one another in a plane of said carrier band.

18. A cable laying configuration disposed in a conduit selected from the group consisting of galleries, tunnels, shafts, pipes, and channels, the configuration comprising:

at least one cable selected from the group consisting of electric cables, data and information transport cables, control cables, fiber optic cables, and fluid transport tubes, said cable said being unwound from a drum from a region of an opening providing access to an installation shaft or access shaft toward a respective pipe or channel, or drawn or fixed in a stationary manner in the pipe or the channel, a stationary positioning of said cable and the cable laying configuration being obtained and ensured by a force of gravity and a frictional fit thus arising with the pipe or channel;

a flexible and/or articulated carrier band having an underside and lateral edges, said carrier band to be pulled into the pipe or into the channel, disposed at a distance from a bottom of the pipe or from a channel sole and laid against an inner wall surface of the pipe or the channel, adjoining both sides with said lateral edges, and forming a substantially flat second bottom in the pipe or the channel disposed above the pipe base and/or the channel sole;

cable supports disposed on said underside pointing the pipe base and/or the channel sole for mounting said cable; and at least one continuous weighting body having a plurality of weighting elements spaced from one another and disposed on the pipe base or the channel sole, said weighting body preventing said cable from floating up due to water or waste water disposed in the pipe or the channel;

wherein said two lateral edges of said carrier band have plastic peripheral sliding profiles gripping said lateral edges for a close fit laterally on the inner wall surface of the pipe or the channel and for a reduction of frictional resistance when drawing said carrier band loaded at a bottom with one of said weighting body and said weighting elements.

19. A cable laying configuration disposed in a conduit selected from the group consisting of galleries, tunnels, shafts, pipes, and channels, the configuration comprising:
at least one cable selected from the group consisting of electric cables, data and information transport cables, control cables, fiber optic cables, and fluid transport tubes, said cable said being unwound from a drum from a region of an opening providing access to an installation shaft or access shaft toward a respective pipe or channel, or drawn or fixed in a stationary manner in the pipe or the channel, a stationary positioning of said cable and the cable laying configuration being obtained and ensured by a force of gravity and a frictional fit thus arising with the pipe or channel;
a flexible and/or articulated carrier band having an underside and lateral edges, said carrier band to be pulled into the pipe or into the channel, disposed at a distance from a bottom of the pipe or from a channel sole and laid a against an inner wall surface of the pipe or the channel, adjoining both sides with said lateral edges, and forming a substantially flat second bottom in the pipe or the channel disposed above the pipe base and/or the channel sole;
cable supports disposed on said underside pointing to the pipe base and/or the channel sole for mounting said cable; and
at least one continuous weighting body having a plurality of weighting elements spaced from one another and disposed on the pipe base or the channel sole, said weighting body preventing said cable from floating up due to water or waste water disposed in the pipe or the channel;
wherein said carrier band is formed from a material that can be bent diagonally to its longitudinal extension, is elastic and can be bent up or down; and said material is selected from the group consisting of plastic, polyester, epoxy resin, steel, steel plate and a plastic/steel composite material.

20. A laid cable configuration disposed in a conduit selected from the group consisting of pipes and channels, said conduit having an inner wall surface and a conduit base, the laid cable configuration comprising:
cables;
a carrier band drawn into the conduit and disposed at a distance from the conduit base, said carrier band having lateral edges fitting against the inner surface wall of the conduit on both sides with said lateral edges in a flexible and/or articulated manner, said carrier band defining a substantially even second bottom in the conduit above the conduit base, said carrier band having an underside;
cable clamps disposed on said underside of said carrier band for supporting said cables;
a flexible and substantially continuous weighting body attached to said underside pointing toward the conduit base, said weighting body supporting said cables, said cable support and said carrier band on the conduit base and preventing said cables found in the conduit from rising in water or waste water, flowing through the conduit, said weighting body being formed by one of:
a flexible cable connected with said carrier band so as to be relatively movable vis-à-vis the same at least in a longitudinal direction of said carrier band, said weighting body formed of a material having a thickness of more than 2 g/cm$^3$; and
a flexible, continuous casing filled with a free-flowing weighting material;
said cables therefore being stationarialy positioned by a force of gravity and a frictional fit with the inner wall surface in the conduit.

21. The configuration according to claim 20, wherein:
said casing is selected from the group consisting of pipes and tubes; and
said free-flowing weighting material being sand having a density of at least 2.2 g/cm$^3$.

22. The configuration according to claim 20, wherein said carrier band is formed with a plurality of articulated band links that can be substantially swivelled to one another in a plane of said carrier band.

23. The configuration according to claim 22, further comprising a base plate attached to said carrier band or to said articulated band links, said base plate having continuous weighting body retaining elements also functioning as said cable clamps, said continuous weighting body retaining elements have retaining clamps or jaws holding said weighting body on both sides, and also holding said cables.

24. The configuration according to claim 23, wherein said retaining clamps or jaws hold said weighting body in a snap connection.

25. The configuration according to claim 22,
wherein said articulate band links have hinge connections for interconnecting said articulated band links; and
further comprising weighting body retaining elements attached to points of said hinge connections of said articulated band links.

26. The configuration according to claim 25, wherein said hinge connections each have a hinged axis and said weighting body retaining elements are attached directly to said hinged axis.

27. The configuration according to claim 22, wherein one of said carrier band and said articulated band links is formed from an elastic material that bends up or down diagonally to its longitudinal extension.

28. The configuration according to claim 27, wherein said elastic material is selected from the group consisting of plastic, polyester, epoxy resin, steel, steel plate and a plastic/steel composite material.

29. The configuration according to claim 22, wherein said lateral edges of one of said carrier band and said articulated band links are bent or flanged upward for a close fit laterally on both sides of the inner wall surface being a concavely bent inner wall surface of the conduit.

30. The configuration according to claim 22, wherein said lateral edges of one of said carrier band and said articulated band links have plastic peripherally sliding profiles gripping said lateral edges for a close fit on the inner wall surface of the conduit for reducing frictional resistance when inserting or drawing said carrier band in with said weighting body or when drawing said carrier band for loading.

31. The configuration according to claim 20, wherein said continuous weighting body supports said carrier band on a side facing the conduit base adjoining the conduit base.

32. The configuration according to claim 20, wherein said continuous weighting body is suspended on said carrier band which is concavely bent and braced laterally with said lateral edges on both sides of the inner wall surface of the conduit at a distance from the conduit base, without contact with the conduit base.

33. The configuration according to claim 20, wherein said weighting body is made in a form of a cable from an iron material.

34. The configuration according to claim 33, wherein said iron material is steel.

35. The configuration according to claim 20, wherein said weighting body having said continuous casing is formed from free-flowing small molded articles, particles, globules, or pellets of mineral substances selected from the group consisting of cement, barium oxide, metallurgical slag, ferric oxide, hematite, metallic materials, and steel.

36. The configuration according to claim 20, wherein said weighting body has gripping retaining elements, selected from the group consisting of clamping gripping retaining elements and jaw-shaped gripping retaining elements, fastened to said underside of said carrier band.

37. The configuration according to claim 20, wherein said carrier band has a dry weather gutter formed therein and lies on the conduit base, said cables and said continuous weighting body are disposed, on both side, laterally beside said dry weather gutter in at least one of empty spaces between said underside of said carrier band and the inner wall surface of the conduit.

38. The configuration according to claim 20, wherein said carrier band has a center and said dry weather gutter is formed at said center.

39. The configuration according to claim 20, wherein said weighting body has retaining elements for engaging with said cables and are made from plastic in one piece.

40. The configuration according to claim 20, further comprising weighting body retaining elements, made in one piece with said cable clamps, and disposed at a distance from one another in longitudinal direction of said carrier band.

41. The configuration according to claim 40, wherein said weighting body retaining elements are disposed at a uniform distance from one another in the longitudinal direction of said carrier band.

42. The configuration according to claim 20, further comprising weighting body retaining elements constructed as a dual holder with a base plate and two retaining clamps extending from said base plate, said retaining clamps spaced from one another, project in longitudinal direction of said carrier band and form retaining clamps of said cable clamps.

43. The configuration according to claim 42, wherein said retaining clamps of said weighting body retaining elements have an inside with a parting compound, lubricant, or lubricant coating which promotes a longitudinal relative sliding displacement of said weighting body vis-à-vis said carrier band and said weighting body retaining elements when inserted or drawn in from a surface into the conduit.

44. A laying cable configuration to be disposed in a conduit selected from the group of pipes and channels and having an inner wall surface and a conduit base, the configuration comprising:

at least one cable;

a carrier band having lateral edges and to be drawn into the conduit and disposed at a distance from the conduit base and fitting against the inner wall surface of the conduit on both sides with said lateral edges defining a frictional fit, said carrier band defining a substantially flat second sole in the conduit above the conduit base, said carrier band having an underside on which said cable is disposed pointing toward the conduit base, said carrier band having a cross section with side zones each surrounded by said lateral edges and extending toward a center of said carrier band, said carrier band having a central gutter and shoulder zones disposed at a same relative high position to one another and flank said central gutter on both sides, said central gutter disposed in a median zone of said carrier band and being U-shaped for accommodating and guiding water or waste water in low-rainfall time periods;

at least one cable holder attached to an underside of said shoulder zones and holding said cable disposed underneath at least one of said shoulder zones; and said the carrier band itself forming a weighting body having a proper mass for preventing said the cable from rising or changing position in water or waste water found in the conduit.

45. The configuration according to claim 44, wherein:
said carrier band is at least one of flexible and articulated;
said carrier band contains a plurality of band links;
said shoulder zones each having equivalent widths and flat surfaces; and
said at least one cable is a plurality of cables with at least one of said cables disposed underneath each of said shoulder zones.

46. The configuration according to claim 45, wherein at least one of said carrier band and said band links are formed from a metal material having a material strength or thickness and thus providing said proper mass, every longitudinal section of said carrier band and each said band link in each case together with said cables supported by said longitudinal sections or via band link lengths have an average thickness of at least $1.05 \text{ t/m}^3$ or a density that is higher by at least 3% than a density of the water flowing in the conduit.

47. The configuration according to claim 46, wherein:
said metal material is steel;
said average thickness is at least $1.10 \text{ t/m}^3$; and
said density is at least 7% higher than the density of water.

48. The configuration according to claim 45, wherein said band links of said carrier band are each configured with their upper sides so as to be angularly rotatable up and down on one another or to one another.

49. The configuration according to claim 45, wherein said band carrier has two flexible longitudinal filaments, said band links are connected to one another so that said band links can be swivelled up and down to one another relative to said carrier band by said two flexible longitudinal filaments.

50. The configuration according to claim 49, wherein said flexible longitudinal filaments are connected to said undersides of each of said shoulder zones, and are selected from the group consisting of steel cables and steel bands.

51. The configuration according to claim 50, wherein said steel bands are attached to said band links of said carrier band by spot welding.

52. The configuration according to claim 50, further comprising clamping elements disposed on a bottom of said band links for attaching said flexible longitudinal filaments to said band links, said clamping elements do not completely surround or clasp said flexible longitudinal filaments in a frictional fit so as to be longitudinally movable.

53. The configuration according to claim 45, wherein:
said carrier band is one of a plurality of carrier bands being said band links connected to one another in an articulated or flexible manner on an underside with an outer contour corresponding to an inside cross sectional contour of the conduit, resulting in a substantially form-fit with the conduit, and against the conduit pipe base; and
at least one of said shoulder zones is formed with chambers closed by a floor wall formed in accordance with as said outer contour and points downward, said chambers include a cable guiding chamber receiving said cable and is laid open on both sides in a direction of a longitudinal extension of said carrier band and a weighting chamber having a common longitudinal wall with said cable guiding chamber, said chambers are substantially closed on all sides and have a closeable and sealable feed opening, said chambers having a density exceeding a density of water by at least 50% and filled, at least partially with further weighting bodies.

54. The configuration according to claim 53, wherein:
said closeable and sealable feed opening is water tight;
said density being greater than 2.5 g/cm$^3$; and
said further weighting bodies formed from minerals selected from the group consisting of barium oxide, hematite, and iron.

55. The configuration according to claim 53, wherein said band links forming said carrier band are formed from a fiber-reinforced plastic material which is resistant to waste and fecal water.

56. The configuration according to claim 53, wherein said further weighting bodies inserted into said weighting chamber of said band links are inserted with balls formed of a material selected from the group consisting of iron and steel.

57. The configuration according to claim 56, wherein said balls all have equivalent dimensions.

58. The configuration according to claims 53, further comprising hinges connecting said band links to each other resulting in articulated band links each disposed in a direction of a longitudinal extension of said carrier band, with a periphery of adjacent ones of said band links adjoining one another in a manner of spherical convex and concave rotational slide surfaces.

59. The configuration according to claim 58, further comprising swivel strips extending along two lateral edges of each of said band links, said swivel strips are configured for a longitudinal fit against the inner wall surface of the conduit.

60. The configuration according to claim 59, wherein said swivel strips are positively locked with said lateral edges and each articulated on an end via said hinges.

61. The configuration according to claim 44, wherein a transition from said shoulder zones of said carrier band to said central gutter is rounded off.

62. The configuration according to claim 44, wherein said central gutter of said carrier band is made so deep that said central gutter lies on the conduit base.

63. The configuration according to claim 44, wherein said central gutter in an area of a deepest point has a lower material thickness than in remaining areas.

64. The configuration according to claim 44, further comprising a transport and unwinding drum, said carrier band for transport to a laying location and for drawing into the conduit is wound on said transport and unwinding drum such that said carrier band projects radially outward with said central gutter made therein.

* * * * *